United States Patent [19]

Numakura et al.

[11] Patent Number: 5,072,305
[45] Date of Patent: Dec. 10, 1991

[54] PICTURE PRODUCING APPARATUS USING PICTURE INFORMATION VALUES CORRELATED TO LIGHT INTENSITIES IN TONAL CONVERSION FORMULA

[75] Inventors: Takashi Numakura; Iwao Numakura, both of Tokyo, Japan

[73] Assignee: Yamatoya & Co., Ltd., Tokyo, Japan

[21] Appl. No.: 666,666

[22] Filed: Mar. 7, 1991

[30] Foreign Application Priority Data

Mar. 8, 1990 [JP] Japan .................................. 2-55204

[51] Int. Cl.$^5$ ...................... H04N 1/23; H04N 1/387; H04N 1/46
[52] U.S. Cl. .................................. 358/298; 358/456; 358/80
[58] Field of Search .................. 358/298, 456, 75, 80, 358/448, 455, 461, 443; 346/157

[56] References Cited

U.S. PATENT DOCUMENTS 4,811,108  3/1989  Numakura .
4,833,546  5/1989  Numakura .
4,924,323  5/1990  Numakura .
4,956,718  9/1990  Numakura .

Primary Examiner—Benjamin R. Fuller
Assistant Examiner—Scott A. Rogers
Attorney, Agent, or Firm—Wenderoth, Lind & Ponack

[57] ABSTRACT

A picture producing apparatus which produces a reproduced picture having a middle tone on a recording sheet based on signals, by obtaining density information values of respective pixels on an original picture from a medium image recorded on a predetermined recording medium, and processing the density information values in a tone adjusting means to obtain the signals. The tone adjusting means conducts the steps of converting the density information values ($D_n$ values) of the respective pixels on the original picture, by using a density characteristic curve defining a relationship between density information values (D values) of the recording medium and picture information values (X values) correlating to incident light intensity from the original picture into the recording medium, into picture information values ($X_n$ values) correlating to light intensity corresponding to the density information values ($D_n$ values) of the respective pixels, and converting the picture information values ($X_n$ values) correlating to light intensity into tonal intensity values (y values) for tone adjustment by operating a specific tonal conversion formula:

$$y = y_H + \frac{\alpha(1 - 10^{-kX})}{\alpha - \beta}(y_S - y_H).$$

11 Claims, 10 Drawing Sheets

Picture Information Value Correlating to Light Intensity →

Picture Information Value Correlating to Light Intensity →

Picture Information Value Correlating to Light Intensity →

PICTURE PRODUCING APPARATUS USING PICTURE INFORMATION VALUES CORRELATED TO LIGHT INTENSITIES IN TONAL CONVERSION FORMULA

BACKGROUND OF THE INVENTION

1) Field of the Invention

The present invention relates to a picture producing apparatus which is capable of converting and processing picture information signals obtained from an original picture, and producing a reproduced picture having an excellent reproducibility in tone in a novel tonal conversion system.

More particularly, the present invention concerns a picture producing apparatus which can form a reproduced picture having an excellent reproducibility in tone and color-tone on a recording sheet by obtaining genuine picture information values from an original picture, and converting and processing the obtained values in a tonal adjustment system, using a specific tonal conversion, upon producing a reproduced picture from one of various types of pictures. In this invention, any objects can be an original picture as far as it is desired to be reproduced on a recording sheet. It should be noted that the original pictures include not only usual original pictures, for example, photographic pictures in monochromatic color or in multiple color, and video signal (TV) pictures, but also subjects or objects to be shot such as still lives, human figures or the like, which can become bases of the original pictures, when producing reproduced pictures in accordance with the present invention.

Further specifically, the present invention concerns an entirely novel picture producing apparatus provided with a tone adjusting system, where, upon producing a reproduced picture from an original picture, picture information values for the reproduced picture are obtained by recording, storing or processing them on an input medium for picture information (for example, photographic material or photoelectric transfer device such as two-dimensional CCD, photomultiplier, photodiode, CCD, or the like is used as the input medium; hereinafter it is referred as "recording medium" collectively), that is, obtained are picture information values correlating to light intensity inputted to such a recording medium for producing a medium image from an original picture, not picture information values correlating to density from a medium image as in conventional manners, and converting and processing such picture information values, by using a specific tonal conversion formula. In the present invention, a picture stored on such a recording media is called as "a medium picture recorded on a recording medium" or merely as "a medium image", in contrast to the term "an original picture".

2) Description of the Related Art

In the case of reproduction of a picture from an original picture having a continuous tone such as a photograph, the picture having a continuous tone corresponding to the original picture is formed (silver salt photographic recording) by subjecting the original picture to an analog process (exposing), if used sensitized paper as a recording sheet therein. On the other hand, in a printer of a various type, a copy machine, or the like (hereinafter referred as "a picture producing system", which should be interpreted in the broadest sense), which records digitally a picture on a plain paper, the picture is not formed in said analog process so that it is difficult to reproduce a gradation of the original picture. In this case, it is particularly difficult in a multicolor reproduction process to control a color-balance together with a gradation.

From the above reason, considerable efforts have been made in improvement of reproducton of tone and color-balance in various picture producing apparatus. The picture producing apparatus is adapted to form a reproduced picture in such a manner that an original picture having a continuous tone such as a photograph is photoelectrically scanned to obtain density information values, it being possible to obtain the density information values in another manner, the obtained density information values are processed and converted into signals, and, based on the signals, a picture having a tone or color-tone corresponding to that of the original picture is formed by distribution of pixels on a recording paper, as similar as in the manner for converting a continuous tone into a halftone in a photomechanical process.

However, as conventional picture producing apparatus has a non-scientific tonal control system for processing density information values obtained from an original picture in order to reproduce the gradation, it is the present condition that there are unavailable satisfactory reproducibility in gradation and color-tone, color-tone having an intimate relationship with gradation.

As well known, a gradation of the reproduced picture depends on a system adapted for representing the density of the pixels. As systems for representing a graduation of pixels, there are some such as a system where a pixel coverage rate is varied with the size of a dot (variable-area system or variable-area dot, this system being adopted in monchromatic and color scanners, ink jets of a piezoelectric type, etc.), a system where a pixel coverage rate is varied with the number of arranged dot of a fixed size (a same size) (variable-concentration system or constant dot, this system being adopted in thermal molten-ink transfer, etc.), and a system where a density of a fixed dot (every dot having the same size) itself is varied (variable-density system or variable-density dot, this system being adopted in thermal sublimation transfer).

However, the present circumstances are such that, if a reproduced picture is intended to form from an original picture in a conventional picture producing apparatus, no scientific study is given to a manner how to set a pixel coverage rate (a ratio of recorded pixels to the number of unit pixels constituting a pixel block), which is represented by a size of a dot or an intensity of a dot corresponding to a density information value of a given sample point (pixel) on the original picture, for example a pixel on a reproduced picture corresponding thereto. namely, a value defining the gradation of a pixel, and a manner how to obtain a tonal intensity value of a pixel (hereinafter referred as "tonal intensity value of pixel", or "tonal intensity value", simply, this term being used commonly in the various representing system for pixel gradation), and a manner how to obtain such a tonal intensity value to a pixel.

As having been developed no scientific formula correlating a density information value of a given pixel on the original picture with a tonal intensity value of a corresponding pixel on the reproduced picture, there is no other way but relying upon a correlation formula established by respective manufacturers, based on their previous experiences and perception, or a limited number of fixed conditions.

It is therefore extremely difficult to obtain a desired reproduced picture excellent in tone or color-tone when an original picture has a quality which is out of manufacturers' supposition, such as a non-standard color-film original (over-exposed, excessively light original; under-exposed, excessively dark original; original in high-key or low-key; color-fogged or faded original, etc.). This results in that has not been developed any flexible picture producing apparatus which can produce a reproduced picture having a desired quality from a standard original and even from a non-standard original, and desirably alter or modify (alteration and modification of tone and/or color-tone) the quality of an original picture.

It means that the conventional apparatus is incapable of scientifically and rationally converting a density information value of a given pixel on an original picture, which value is a picture information value on the original and is extremely important in production of a reproduced picture, into a tonal intensity value of a corresponding pixel on the reproduced picture.

A cause of the above problem inherited in the conventional apparatus is admitted to lie in the conception of the conversion step of gradation of a picture, which step takes an important role in the initial stage when finally producing a reproduced picture by means of a distribution of pixels from an original such as a continuous-tone picture.

It is admitted that the conventional tonal conversion technique of pictures is carried out, relying entirely on experiences and perception, not on the basis of scientific and rational techniques, when converting a density information value of a given pixel of an original picture into a tonal intensity value of a corresponding pixel on a reproduced picture.

SUMMARY OF THE INVENTION

Under these circumstances, the inventors have studied earnestly over and over again, on the basis of a fundamental conception that establishment of a rational tonal conversion technique is necessary for achieving ultimate rationalization in the picture processing steps and producing reproduced pictures having excellent qualities.

Finally, it has been found that a reproduced picture having an excellent reproducibility in gradation may be produced by obtaining picture information values of a genuine object of the reproduced picture (original picture), a step of which is indispensable to reproduction of a picture, and processing the obtained values using a specific tonal conversion formula to obtain tonal intensity values, although in the conventional technique there are employed picture information values obtained from a picture information detecting (reading-out) mechanism in a picture producing system, in more concrete terms, picture information values obtained from a medium image recorded or stored on a recording medium such as CCD.

As previously described, an important matter of the present invention is which value is used as picture information values as being indispensable for reproduction of pictures, the picture information values employed in the present invention being quite different from those in the conventional technique.

To clarify this from a view of a picture or an image which will become an object of a reproduced picture, paying an attention to the time when an object for reproduction is recorded or stored on a recording medium constituting a picture information acquisition mechanism in a picture producing apparatus, and regarding the time as a border;

(i) a material which will become a genuine object for reproduction is termend as "original picture constituting the basis of a medium image", or "real image". (herein called as "real image" in order to emphasize a feature of this invention, though generally called as "original picture", or called as "subject" when an original picture is considered as a subject or, an object to be shot or pickedup.); and (ii) what is recorded or stored on said recording medium is termed as "medium image".

Picture information values of an original picture, which values are used for conversion of gradation in this invention, are not density information values (any values may be employed as far as they correlate to density as described hereinafter, and they should be interpreted in the broadest sense) obtained from a medium image, but picture information values correlating to light intensity which is obtained via a characteristic curve of a recording medium (hereinafter, a characteristic curve provided to a recording medium in any recording medium system being referred as "density characteristic curve"), which curve defines a relationship between density information values and picture information values correlating to incident light intensity from an original picture into the recording medium. According to the present invention, the picture information values correlating to light intensities are converted and processed by using a specific tonal-conversion formula to obtain tonal intensity values for tonal conversion so as to produce a reproduced picture with picture properties faithful to the original picture (real image or subject), or a reproduced picture with properties having been desirably modified or altered.

It should be noted that an original picture (real image) means a picture to be a genuine object of a reproduced picture. It should be thus distinguished from a medium image presented on a various recording medium, the recording medium constituting a picture information detecting (reading) mechanism in a picture producing system employed upon obtaining picture information for production of a reproduced picture.

An object of the present invention is to provide a picture producing apparatus which is therein incorporated a new and novel technique for producing reproducing pictures, particularly a tonal conversion technique of picture, which is the crux of the technique, wherein weight is given to picture information values of an original picture (real image), which should be a genuine object for reproduction, in other words, picture information values correlating to incident light intensity from the original picture into the recording medium system, while in the conventional technique weight is given to density information values obtained from a medium image recorded on a recording medium of various types.

In one aspect of the present invention, there is thus provided a picture producing apparatus which produce a reproduced picture having a middle tone on a recording sheet based on signals by obtaining density information values of respective pixels on an original picture from a medium image recorded on a predetermined recording medium, and processing the density information values in a tone adjusting means to obtain the signals, comprising the tone adjusting means for conducting the steps of:

(1) converting the density information values ($D_n$ values) of the respective pixels on the original picture, by using a density characteristic curve defining a relationship between density information values (D values) of the recording medium and picture information values (X values) correlating to incident light intensity from the original picture into the recording medium, into picture information values ($X_n$ values correlating to light intensity corresponding to the density information values ($D_n$ values) of the respective pixels;

(2) converting the picture information values ($X_n$ values) correlating to light intensity into tonal intensity values (y values) for tone adjustment by operating a tonal conversion formula (1):

$$y = y_H + \frac{a(1 - 10^{-kX})}{a - \beta}(y_S - y_H)$$

where

X: ($X_n - X_{H\ n}$), namely, a basic light intensity value obtained by subtracting a picture information value ($X_{H\ n}$) correlating to light intensity of the brightest part of the original picture obtained via the density characteristic curve from a density information value ($D_{H\ n}$) of the corresponding brightest part (H part) of the original picture, from a picture information value ($X_n$) correlating to the light intensity of a pixel obtained from a density information value ($D_n$) value of a corresponding arbitrary pixel on the original picture by using the density characteristic curve;

y: a tonal intensity value set to a pixel on the reproduced picture corresponding to an arbitrary pixel on the original picture;

$y_H$: a tonal intensity value set in advance to the brightest part (H part) of the original picture;

$y_S$: tonal intensity value set in advance to the darkest part (S part) of the original picture;

α: a surface reflectance of a recording paper forming the reproduced picture thereon;

β: a value determined by $\beta = 10^{-\gamma}$;

$$K: \frac{\gamma}{X_{Sn} - X_{Hn}},$$

where $X_{s\ n}$ represents a picture information value ($X_{s\ n}$) correlating to light intensity of the corresponding darkest part obtained via the density characteristic curve from the density information value ($D_{s\ n}$) of the darkest part (S) on the original picture;

γ: an arbitrary coefficient.

The advantages of the present invention are as follows: (1) Conventional determination of a relationship between a density value of a given pixel on an original picture such as a continuous-tone picture and a tonal intensity value of a corresponding pixel on a reproduced picture, which is the most basic step in production of a reproduced picture, has been made based on experiences and perception of the operator, or data collected under a limited number of fixed conditions, thus being irrational. To the contrary, the present invention permits this to be rationally carried out by using the tonal conversion formula (1) under any conditions. When converting an original picture such as a continuous-tone picture into a reproduced picture formed by distribution of pixels, the most important element in the technique is management of tone (tonal conversion, and modification or alteration), which largely relates to not only gradation of the picture but also color-tone, directly. The present invention also permits rational management of gradation and tone. That is, a picture producing apparatus of this invention incorporated algorithm of the tonal conversion formula (1) permits the tonal conversion work to become a theoretical, rational system, and to be carried out simply, its effects being thus noticeable.

(2) Rationalization and simplification of a picture producing apparatus is accomplished by incorporating the algorithm of the tonal conversion formula (1) in a tone adjusting mechanism thereof, thereby realizing reduction of manufacturing cost. Also the operation may be simplified and clarified, redoing of the work and consumption of the materials may be remarkably reduced, and the performance of the picture producing apparatus may be largely improved. Particularly, it has a merit in that a reproduced picture excellent in tone or color-tone can be produced from an original picture, if having any quality.

(3) A tone adjusting mechanism incorporated the algorithm of the tonal conversion formula (1) therein allows an evaluation standard for the quality of a recorded picture to be rationally, simply defined, separated from picture information values of an original picture, thus being capable of rationally meeting various demands of customers.

(4) Engineer education and training required by reason of sophistication of picture producing apparatus such as printers, copy machines, etc. can be given effectively in the course of operations of the tonal conversion formula (1). This also brings about labor saving, thereby ensuring time to spare for new developments.

The above and other objects, features and advantages of the present invention will become apparent from the following description and the appended claims taken in conjunction with the accompanying drawings, in which:

DETAILED DESCRIPTION OF THE INVENTION

Figure 1:
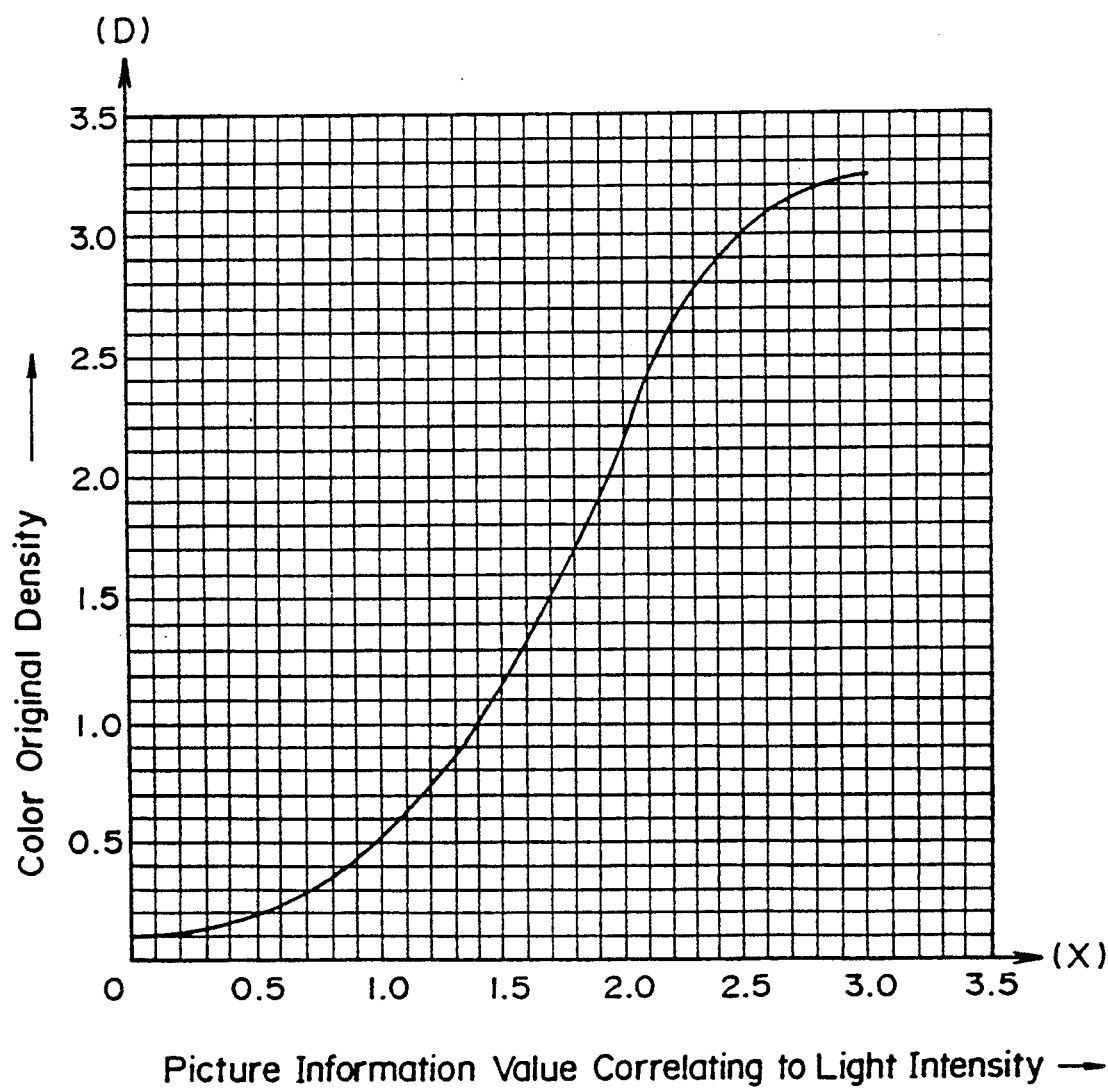
FIG. 1 is a graphical representation of a photographic density characteristic curve of a color-film.

Constitution of the present invention will be hereinafter described in detail.

At first, reference will be made to the theoretical background adopted in a picture producing apparatus according to the present invention, in order to clarify a standpoint of this invention.

Incidentally, as the theory of the tonal conversion of picture of this invention has been established for the purpose of solving problems lying in the tonal conversion process for producing printed pictures, the tonal conversion being technique representative among techniques for producing reproduced pictures, description will be made mostly relating to a production technique by a scanner (monochrome or color-scanner). However, this is only for convenience of explanation. Accordingly, the merit of the theory of the tonal conversion technique according to the present invention, herein described, will not be diminished even if the theory is built-in in a conventional picture producing system, because a similar problem also lies in the conventional picture producing system of various types such as printer, copy machine, associated equipments of DTP (desktop publishing), whenever the tonal conversion process is carried out therein.

The inventors consider that a rational, theoretical substantiation is required for the tonal conversion technique of pictures. The inventors also consider that, in order to rationally produce a reproduced picture having reproducibility of a tone (including both gradation and color-tone) and furthermore a desired tone even from a various original picture, importance should be given primarily to a technique permitting rational conversion of gradation of each pixel of a picture, prior to improving a technique for color-correction (amendment), while there are two elements in the technique for producing reproduced pictures, the elements forming a core of the technique, namely, gradation control technique and color-correction technique.

The above described is to ask a reconsideration about the conventional technique wherein a color-correction (amendment) technique or color-matching technique, where a scientific analysis (analysis by "masking equation" or "Neugebauer equation") is relatively easy in the production of reproduced pictures, is regarded as more important than the tonal conversion technique for gradation, as typically seen in production of color-printed pictures.

The inventors also have a basic recognition that, in the conventional technique for converting gradation of pictures used upon production of a reproduced picture from an original pictures, the density characteristics ranging from the brightest part to the darkest part of the original color-film (original picture) is not rationally grasped and the definition of a correlation (tonal conversion formula) between the both pictures (original picture and reproduced picture), the correlation being indispensable upon faithfully converting the original picture into the reproduced picture with a density characteristic at a ratio of 1:1, is not backed up by a rational theory, thus the technique remaining entirely in operator's experiences and perception, when the reproduced picture, as a printed picture, for example, is produced from the original picture.

Based on such basic recognition, a tonal conversion formulae has been proposed by the present inventors, for the purpose of accomplishing a scientific, rational tonal conversion technique for pictures (Japanese Patent Laid-Open Publication No. 64-7770, Japanese Patent Publication Nos. 63-114599 and 63-207326, U.S. Pat. No. 4,811,108).

It has been however found in the course of research taken by the inventors that the above-described tonal conversion technique for pictures adopted the above specific tonal conversion formulae therein has a certain limitation.

The limitation is such that, in the conventional tonal conversion technique for pictures, including the previous proposals made by the inventors, an original picture is recorded or stored on a recording medium system in the apparatus for producing a reproduced picture to obtain picture information of the original (real image), and the tonal conversion is conducted on the basis of density information value, as a key, obtained therefrom. This means that photosensitivity characteristics and photoelectric transfer characteristics of the recording medium system largely affect so that the picture information of the original picture (real image) itself cannot be used.

This will be now described taking a case of producing a color printed picture, as an example.

A color-film original is a medium image, so-called in the present invention, which is a picture such as still life or human figure has been taken on a recording medium or a photographic material. If density information values are detected (read-out) from the color-film original (medium image) and are used for tonal conversion of the picture, picture information of the subject (real image) might not be used as the base. In other words, in the conventional production technique for printed pictures employed a color-film original (real image) therein, color separation process (including both color-correction and gradation control) is carried out, on the basis of the density information value of the photographic picture which is a record of incident light from the subject to photographic material (photographic emulsion layer) as a recording medium under a certain exposure conditions. Incidentally, a light exposure E is expressed by $E = It$, where an intensity of incident light I and incident time t as well known.

A photographic material on which a subject is taken is formed photographic density thereon by development, thereby forming a medium image. A curve which represents a correlation between the photographic density (blacking degree) and light exposure E of the photographic material is a photographic characteristic curve. The photographic characteristic curve is plotted in such a manner that a photographic density (D) ($D = \log I_o/I$) is entered along the vertical axis of a coordinates and a logarithmic value of light exposure E ($\log E$) is entered along the horizontal axis. In the case of films or dry plates (transparent original), a ratio of an intensity of transmitted light I to an intensity of incident light $I_o$ is used, and in the case of photographic printing papers (transparent original), a ratio of an intensity of reflected light I to an intensity of totally reflected light is used, needless to say.

It is a well known matter that a typical photographic characteristic curve has a considerably complex figure (see FIG. 1), which has a toe portion in a recess shape at its lower end and a shoulder portion in a convex shape at its upper end.

In other words, the conventional color-separation technique for producing color-printed pictures is formed from a viewpoint of the vertical axis (density value) of a photographic characteristic curve, thus not formed from a viewpoint of incident light exposure from a subject to a photographic material or the horizontal axis (picture information values correlating to light intensity) of the photographic characteristic curve. The above "incident light exposure from a subject to a photographic photosensitive material" is hereinafter referred in a wider sense as "picture information value correlating to light intensity", since either an absolute value of light exposure or a relative value of the same is adoptable in the present invention, as described hereinafter. The density information values of a color-film original, which become the base of a color-separation process in accordance with the conventional technique, is different from picture information values correlating to light intensity of a subject (real image), that is, the picture information of the subject is not given to the shape of the photographic characteristic curve, as obvious from the shape thereof. Moreover, aspects of estrangement between the density information values and the picture information values are various, depending upon change of given conditions such as exposure conditions and development conditions.

An effect of the photosensitive characteristics of the photographic material as a recording medium, does not permit the picture information values correlating to light intensity of the subject (real picture) to be correlated with the photographic density, which is density information values of the color-film original or the medium image, in a linear relationship, for example, at a ratio of 1:1 or at 45°.

On the other hand, it is a well known matter that discrimination characteristics of human visual sense to brightness is logarithmic. Therefore, man evaluates incident light intensity, i.e., brightness, from a subject (real image) to his visual system, on the basis of said discrimination characteristics. Man thus feels a density of which change has a linear gradient natural.

Therefore, if a process for producing a color-printed picture is carried out based on density values of a medium image recorded on a photographic material, there is used density information values which have been affected with a photosensitive characteristics of the photographic material, not used picture information values correlating to light intensity of a subject (real image), which is to be a genuine object for reproduction.

Thorough examinations have been taken by the present inventors, taken into the account the described circumstances, into a method for producing various reproduced pictures based on picture information values correlating the primary (row or primitive) light intensity given from an original picture (real image or subject) to be a true object for reproduction. Density information values of a medium image which have already been affected with photosensitive characteristics or photoelectric transfer characteristics of various picture recording media (photographic emulsion or photoelectric transfer element such as two-dimensional CCD, photomultiplier, photodiode, CCD, etc.) are not used in the method.

As a result, a color-printed picture in halftone, which is superior and has a picture characteristics faithful to a camera subject (real image), may be formed in the following steps:

(1) obtaining a value on the horizontal axis (log E) of a photographic characteristic curve from a value on the vertical axis (D=log Io/I) (hereinafter, the vertical axis referred as "D axis" and the horizontal axis as "X axis"), that is, projecting a density information value (D value) on the D axis of a color-film original (medium image) ranging from the brightest part to the darkest part thereof defined on the photographic characteristic curve to determine picture information value (X value) on the X axis;

(2) specifically, projecting a density value ($D_n$ value) on the D axis of an arbitrary pixel on the medium image via the photographic characteristic curve onto the X axis to determine a picture information value ($X_n$ value) of a corresponding pixel, [the picture information value (Xn value) being referred as "picture information value correlating to incident light intensity from a subject to a recording medium" or simply "picture information value correlating to light intensity", since, while X axis for a photographic characteristic curve represents logarithmic values of light exposure, either their absolute values or relative values read out on the same scaling of the D axis is equally effective in the present invention];

(3) based on the Xn value such obtained, determining a tonal intensity value showing a dot area % value, by using the specific tonal conversion formula which has been proposed by the inventors, thereby controlling a size of the dot.

Having been described a tonal conversion method for pictures adopted in a picture producing apparatus according to the present invention, taking production process of a printed picture as an example, this is also effective in production of another reproduced pictures. Particularly features of the present invention is that when a density information value of an arbitrary pixel on an original picture is converted into a tonal intensity value of a corresponding pixel on a reproduced picture, there is not used an intensity information value itself as a picture information value of the pixel, which is obtained from a medium picture and recorded or stored on a recording medium of various types, that is, a picture information value (correlating to incident light intensity from the original picture into the recording medium of a various type) of the original picture (real image), which is to be a genuine object for reproduction, is determined from the density information value by utilizing a photosensitive characteristic curve or a photoelectric transfer characteristic curve of a recording medium system, and the thus-determined picture information value is processed by using the tonal conversion formula (1) to be converted into a tonal intensity value.

Hereinafter, a manner to lead the tonal conversion formula (1) of this invention will be described, together with features thereof.

Relating to a reproduced picture produced by a picture producing apparatus, basic elements constituting the reproduced picture are tonal intensity values of a predetermined pixel and a surface reflection density of a material forming a picture. As seen from the fact, for instance, that human visual sense has an ability to easily identify a difference of 1% in size of a dot on a reproduced picture, the tonal intensity value of a pixel, which is in a same relationship with the size of a dot, plays an important role, as being a forming means of a picture. For instance, if focusing on a dot set to a predetermined pixel and examining effects of a change of the quantity of an ink applied on a dot and a change of the size of a dot, it will be recognized that the latter has a noticeably greater effect. It is a very important matter how to set a tonal intensity value when producing a reproduced picture having an excellent reproducibility in tone. A reproduced picture having a superior reproducibility in gradation has also an excellent reproducibility in color-tone, this being ascertained in a number of examples.

Relating to the above description, when producing a reproduced picture by means of a picture producing apparatus, the process has such a background as there are an infinite variety of qualities of original pictures, various characteristics of the process for forming a picture, non-uniformity of evaluation standard for picture quality, etc. There has been a strong demand for a picture producing apparatus built-in a mechanism, being capable of overcoming these complex, unstable factors.

It is therefore required a means which allows a tonal intensity value (Yn) of a pixel in the brightest part of a reproduced picture and a tonal intensity value (Ys) of a pixel in the darkest part of the same to be arbitrary selected, and also rational, simple adjustment and control of gradation ranging from the bright part of a picture to the darkest part of the same, if producing a reproduced picture having a middle tone from an original by means of a picture producing apparatus.

From this point of view, provided is a method for adjusting a tone according to the present invention, more specifically, a method for adjusting a tone by operating said tonal conversion formula (1).

The present inventors have proposed a tonal conversion formula, preceding the present tonal conversion formula (1), which is similar thereto, for the purpose of conducting a rational conversion of tone (conversion from a continuous tone into a halftone), upon producing a printed picture in halftone from a color-film original in continuous tone (referring to Japanese Laid-Open Publication No. 64-7770 and Japanese Publication No. 63-114599). However the preceding tonal conversion formula is used in a way quite different from the one according to the present invention.

The preceding tonal conversion formula for determining a value (y) of dot area %, used upon producing a printed picture in halftone, [the formula having a constitution similar to the present tonal conversion formula (1), but operated in conditions quite different therefrom] is derived from a general density formula (photographic density, optical density), that is:

$$D = \log Io/I = \log 1/T$$

where
  Io: a incident light intensity;
  I: a reflected or transmitted light intensity; and
  T = I/Io: reflectance or transmittance.

The preceding tonal conversion formula may be derived, by applying the general density formula.

When the general formula relating to density D is applied to plate-making or printing, the following formula is given:

Density $(D')$ in plate-making or printing $= \log Io/I$ $= \log$ (unit area × reflectance of paper)/[(unit area − dot area) × reflectance of paper − dot area × surface reflectance of ink]

$= \log \dfrac{\alpha A}{\alpha\{A - (d_1 + d_2 + \ldots d_n)\} + \beta(d_1 + d_2 + \ldots d_n)}$ where:
  A: unit area;
  $d_n$: area of each dot in a unit area;
  $\alpha$: reflectance of printing paper; and
  $\beta$: surface reflectance of printing ink.

The preceding tonal conversion formula so-derived is then incorporated demands to arbitrarily set a dot having a desired size to the H and S parts of a printed paper and to rationally relate a basic density value (x) of an arbitrary sample point on a picture in continuous tone (original picture) to a value (y) of dot area % of a corresponding sample point on a picture in halftone (printed picture) so as to approximately coincide a theoretical value with a measured value. As a result, a tonal conversion formula (2) is derived:

$$y = YH + \dfrac{\alpha(1 - 10^{-kx})}{\alpha - \beta} \cdot (YS - YH)$$

where:
  X: a basic density value of an arbitrary pixel on an original picture, namely, difference between a density value of an arbitrary pixel on the original picture and a density value of the brightest part of the same;
  Y: a dot area % value of a dot of a desired size of a pixel on a printed picture, corresponding to the pixel on the original picture;
  $Y_H$: a dot area % value of a dot of a desired size, set to the brightest part H on the printed picture;
  $H_S$: a dot area % value of a dot of a desired size, set to the darkest part S on the printed picture;
  $\alpha$: reflectance of a printing paper;
  $\beta$: a value obtained from $\beta = 10^{-\gamma}$;
  k: a value obtained from $\gamma/$(density range of an original picture); and
  $\gamma$: an arbitrary value.

When the above tonal conversion formula (2) is applied to tonal conversion of a picture upon producing a printed picture, the formula is operated in such a manner that values of $\alpha$, $Y_H$, $Y_S$ and $\gamma$ are arbitrarily selected to obtain, from a basic density value (x) of an arbitrary pixel on an original picture, a dot area % value (y) of dot of a corresponding pixel on a printed picture, whereby faithful reproduction of gradation on the original picture at 1:1 is accomplished and also a printed picture having a desired quality (desired gradation and color-tone) is produced.

Incidentally, in the case of color plate-making [considered that four plates (cyan (C), magenta (M), yellow (Y) and black (B)) making up one set], if once a working reference characteristic curve of a reference plate (in color plate-making process, cyan plate becoming the reference, as well known) is determined, that is, if once a halftone gradation characteristic curve (a curve obtained by plotting said x and ÿ values, this becoming a reference for converting a continuous tone into a halftone) which becomes a working reference for converting a density information value of an original picture into a halftone dot area value of a printed picture is determined, halftone gradation characteristic curves of another plates may be rationally determined any time, by multiplying the y value of the reference plate by an appropriate adjustment value determined base on a gray-balance ratio of each printing inks. It is a matter of course that thus-determined halftone gradation characteristic curves for respective plates are rational, furthermore, relationships relating to tone and color-tone among these characteristic curves are rational and appropriate.

If tonal conversion of a picture is carried out based on said tonal conversion formula (2) upon producing a printed picture in halftone from an original picture in continuous tone, optional and rational tonal conversion of pictures will be allowed, free from the conventional tonal conversion method relying on experiences and perception. Moreover, a rational adjustment of color-tone having an intimate, inseparable relationship with tone will be possible. Whereby a printed picture having a natural gradation gradient and color-tone natural to human visual sensation is obtainable.

Having been described in the case of production of a printed picture in halftone as a reproduced picture, it is a matter of course that the theory supporting a tonal conversion process making use of the tonal conversion formula (2) may be used for production of a reproduced picture by means of a various printer, copying machine, etc.

It should be noted that when the tonal conversion formula (2) is operated for production of a reproduced picture, a density information value is used therein for conversion of the gradation.

To the contrary, in tonal conversion of a picture according to the present invention, picture information values correlating to light intensity as a picture information value of an original picture (real image), which should be employed upon tonal conversion, are employed, instead of density information values employed conventionally, in order to achieve more excellent gradational conversion, as stated before. It is natural that the tonal conversion formula (1) will appear when an operational conditions of the tonal conversion formula (2) is arranged in order to carry out the tonal conversion according to the present invention, the technique of which is different from the conventional, of course.

Now will be described meanings of each term in the tonal conversion formula (1) of this invention and features thereof upon operation.

When operating the tonal conversion formula (1) of this invention, a basic light intensity (x) should be determined from a medium image which is a record of an original picture stored on a predetermined recording medium. As described previously, the basic light intensity (x) is determined, via a density characteristic curve of a recording medium on which an original picture is recorded or stored, using a density information value (Dn value) of a predetermined pixel on the original picture, as a key.

In the present invention, anything may be employed as a density information value, as far as it reflects a physical quantity relating to density belonging to each pixel on an original picture, the term of which should be read in the broadest sense. As synonyms, recited are reflection density, transmission density, luminance, current value, voltage value, etc. These density information values can be picked up as a density information signals by photoelectrically scanning an original picture, or by another similar manner. Incidentally, in the case of the tonal conversion formula (1), if a basic light intensity (x) is obtained from a picture information value correlating to light intensity represented on the horizontal axis of a coordinates showing a density characteristic curve, which horizontal axis has a same scale as the vertical axis (taking a positive color-film shot a human figure thereon as an example, if it has density values ranging from 0.2 to 2.70 on the vertical axis, values on the horizontal axis corresponding thereto will be employed), at the same time % values (for example, coverage rate of a pixel, such as 5%, 95%, or the like) are employed for $y_H$ [a tonal intensity value set to a pixel of the brightest part (H)] and $y_S$ [a tonal intensity value set to a pixel of the darkest part (H)], a y value (a tonal intensity value set to a pixel on a reproduced picture, which is corresponding to a given pixel on the original picture) will be calculated in a % value.

It is free to arbitrarily process, deform, or induce the tonal conversion formula (1) of this invention upon operation, besides modifying such as:

$$y = y_H + E(1 - 10^{-kX})(y_S - y_H)$$

provided:

$$E = \frac{1}{1 - \beta} = \frac{1}{1 - 10^{-\gamma}}$$

In the above modified example, a $= 1$. This means that a surface reflectance of a recording paper (base material) recorded a reproduced picture thereon is assumed to be 100%. Practically 1.0 may be adopted as a value for $\alpha$, if an adjustment of the zero position of a density measuring mechanism is carried out on the bases of the recording paper.

According to the above modified example (when $\alpha = 1$), it is possible to predeterminedly set $y_H$ to the brightest part H and $y_S$ to the darkest part S on a reproduced picture produced by a picture producing apparatus. This is obvious from the fact that in the brightest part H on the reproduced picture x becomes 0, and in the darkest part S, x becomes $[X_{s\,n} - X_{H\,n}]$, that is:

$$kX = \gamma \cdot \frac{[Xsm - XHn]}{[Xsn - XHn]} = \gamma$$

therefore:
$$-kX = -\gamma.$$

In operation of the tonal conversion formula (1) of this invention, values of $\alpha$, $\beta$ and $\gamma$ ($\beta$ value being defined by $\beta = 10^{-\gamma}$, as described before) take various values. According to the present invention, a rational conversion and process of tone of a picture, if any type of quality characteristics the original picture has, can be carried out by selecting these values appropriately.

The tone converting and processing method based on the tonal conversion formula (1) of this invention is remarkably useful in reproduction of a gradation or color-tone of an original picuture. i.e., reproduction of a tone of the original picture onto a reproduced picture at a rate of 1:1, its usefulness is however not limited to this. As seen from the charactersitics of the tonal conversion formula (1), the formula is considerably useful to rationally alter or modify the characteristics of an original picture, by appropriately selecting α, β and γ values, and $y_H$ and $y_S$ values in addition, besides being useful to faithfully reproduce the characteristics of an original picture. It will be readily seen from the operation of the tonal conversion formula (1) that a parameter, γ value, among parameters in the tonal conversion formula (1) does play an important role for adjusting (including modifying and altering) the characteristics of an original picture.

When forming a multi-colored picture using the tonal conversion formula (1), for example, when producing a reproduced picture from an original color-film picture, the picture formation may be carried out in such a manner such that reflected light or the like emitted from the color-original is separated into blue (B), green (G) and red (R) lights by using a conventional color-separation technique well known in the field of printing or the like to obtain signals of the respective lights correlating to light intensity, the obtained signals are converted into picture information values (x value) correlating to light intensity, the converted values are processed in a tone adjusting apparatus incorporated the tonal conversion formula (1) therein, and a recording part of the picture forming apparatus is adjusted based on the information values (y value) thus processed to produce a picture. At the moment, the y values correlating to a reference plate (C plate, for example), namely, a tonal characteristic curve of the reference plate (a tonal characteristic curve being obtained by calculating the y values and plotting the y values corresponding to the x values), which is similar to a halftone tonal characteristic curve in printing technique, as previously described, is first defined, tonal characteristic curves of another plates (M and Y plates) are secondary rationally defined by multiplying the y values of the reference plate by an appropriate adjusting value determined based on a gray-balance of each ink so that a picture may be formed by using these tonal characteristic curves.

Not only such-defined tonal characteristic curves for the respective color-plates are rational, as they being defined by the tonal conversion formula (1), but also interrelationships relating to tone or color-tone among these characteristic curves are rational and appropriate.

Next will be described a manner for obtaining a picture information value (x value) correlating to incident light intensity of a given pixel entering into a recording medium, from a density information value (D value) of a corresponding pixel on an original picture, utilizing a density characteristic curve belonging to the recording medium.

To obtain picture information values, specifically density information values, from an original picture for conducting tonal conversion according to this invention, the original picture is recorded on a various recording medium such as photographic photosensitive material, two dimensional CCD, photomultiplier, photodiode, etc. The density information values of the respective pixels on the original picture, obtained from the original picture, are used for determining picture information values correlating to light intensity of the corresponding pixels, via a density characteristic curve (a characteristic curve defining a relationship between density information values read out from a recording medium recording an original picture thereon and picture information values correlating to incident light intensity entering the original picture into a recording medium) which belongs to the recording medium. It is therefore necessary to appropriately or approximately express the density characteristic curve of each recording medium in the form of a functional formula (numeral equation).

As will be herein described a manner to formulate a photographic density characteristic curve, taking a case of using a color-film original (medium image), of which recording medium is a photographic material, formulation of different density characteristic curves of another recording media may be conducted in the same manner. When used a color-film original (medium image), a genuine object (real image) for reproduction is to be a subject (substantial picture) such as a still life or a human figure, which has been shot on the color-film, as previously described.

A photographic density characteristic curve shown in FIG. 1 is of a color-film [Fujichrome (tradename) manufactured by Fuji Photo Film Co., Ltd.]. Incidentally, FIG. 1 shows a photosensitive characteristic curve (photographic characteristic curve) of R emulsion layer of the color-film because the following formulation is based on an assumption that a tonal characteristic curve of the C plate, which becomes a reference among the plates, is set therein. Accordingly, it is a matter of course that another photosensitive characteristic curves (photographic characteristic curves) of G and B emulsion layers may be used for the respective plates (M and Y plates).

A suitable manner may be adopted to formulate the photographic density characteristic curve, there being no limitation thereto.

For example, if the vertical axis $=D=\log Io/I$, the horizontal axis $=X$ (provided that a scale of the x axis is coincided with that of the D axis), and a, b, c, d, e and f are constants, the formulation may be carried out in the following manner;

(1) toe portion (a portion in a recessed shape, where the D values are small) of the photographic characteristic curve:

$$D = a \cdot b^c \cdot (x+d) + e + f.$$

(2) approximately linear portion (a portion in an approximately linear shape, where the D values are medium):

$$D = a \cdot X + b,$$

or $$D = a \cdot X^2 + bX + c;$$

and (3) shoulder portion (a portion in an convex shape, where the D values are large):

$$D = a \cdot \log \{b + (X+c)\} + d.$$

Table 1 shows the formulated photographic characteristic curve shown in FIG. 1. Table 1 has a plurality of sections, in order to formulate the photographic characteristic curve as accurately as possible.

TABLE 1

List of functional formulae of a
photographic characteristic curve
[List for formulation of a photographic characteristic curve
(FIG. 1) of a color-film (Fuji Chrome)]
Formulae for forconverting density values (Dn) of a
color-original on the D axis into values (Xn) on the X axis

| No | Dn | Xn |
|---|---|---|
| 1 | 0.10–0.50 | $X = \log\{(D-0.0424) \div 0.04576\}$ |
| 2 | 0.50–1.00 | $X = 1.00 + 0.7800(D-0.50)$ |
| 3 | 1.00–1.50 | $X = 1.39 + 0.6200(D-1.00)$ |
| 4 | 1.50–2.00 | $X = 1.70 + 0.4400(D-1.50)$ |
| 5 | 2.00–2.50 | $X = 1.92 + 0.4200(D-2.00)$ |
| 6 | 2.50–2.80 | $X = 2.13 + 0.5000(D-2.50)$ |
| 7 | 2.80–2.95 | $X = 2.28 + 0.8000(D-2.80)$ |
| 8 | 2.95–3.20 | $X = 1.3 \pm e^{(1/100) \cdot 10(D-2.5608) \div 0.3975}$ |

In the present invention, a correlation between the D and X is functionally formulated, assumed that the scale of the D axis which shows the density values of a color-film original (medium picture) and the scale of the X axis which shows the picture information values represented by log E entering into the color-film from the subject (real picture) are the same.

This treatment is a kind of relativization (fiction), being considered by the inventors to be rational.

That is, from a viewpoint that the X axis of a photographic density characteristic curve takes logarithmic values of light exposure E ($\log E = \log I \times t$), and this corresponds to the fact that it is logarithmically evaluated as linear (straightness, linearity) by the human visual discrimination characteristics to brightness, such relativization (fiction) to make the D axis have a same scale as the X axis is considered to be rational. As will be shown in the following preferred embodiment, an excellent result is obtainable in tonal conversion of a picture by taking this relativization. Incidentally, as the above scaling is a kind of simplified way, another way is possible, of course.

The present invention is intended to be based on not a density information value ($D_n$ value) represented on the D axis, which information value belongs to each pixel of a subject (real image), as previously stated, but a picture information value correlating to light intensity represented on the X axis. And, the $D_n$ and $X_n$ values of the photographic characteristic curve are correlated to each other by the formula, such as $X = f(D)$, as shown in Table 1, thus the $X_n$ value can be readily determined from the $D_n$ value.

In the manner described above, it is possible to readily determine picture information values ($X_n$ values) correlating to incident light intensity from a subject into a photographic emulsion layer.

A y value corresponding to each pixel can be next determined from the rationally-determined $X_n$ value of each pixel of the subject (real image), using the tonal conversion formula (1).

As previously mentioned, when the $X_n$ values and the corresponding y values are plotted on an orthogonal coordinate system, of which X axis (horizontal axis) represents the $X_n$ values and vertical axis represents the y values, a tonal characteristic curve can be obtained thereon. To discriminate the present invention from the conventional technique, the tonal characteristic curve will be referred as "X axis color-separation curve" and what gives weight to the conventional density information values on the D axis will be referred as "D axis color-separation curve".

Hereinafter will be described features of the X axis color-separation curve obtained in accordance with this invention and features of the conventional D axis color-separation curve.

When the tonal conversion formula (1) is operated under constant conditions, that, $\alpha$, $y_H$, $y_S$ and $\gamma$ values are operated as being constant and a plurality of originals of which picture qualities are different from each other (i.e, each original having a different density range and different density information values) as color-film originals are used to determine the respective X axis color-separation curves (tonal characteristic curves), relative relationships among all the y value arrangements ranging from the H part to the S part of the final reproduced picture (a printed picture, for example) are made identical by the respectively-obtained X axis color-separation curves. This is one of remarkable features of this invention. Namely, as shown in the following embodiments, if ranges of the picture information values (X values) correlating to light intensity represented on the X axis of each color-film original differ from each other (this being assumed to be natural when the density ranges differ from each other, since this is a reflection of differences in quality of original color-film pictures), their adjustment to a predetermined, equal X axis range permits the X axis color-separation curves, obtained in accordance with this invention, to converge into a single (sole) curve.

Consequently, observing the respective X axis color-separation curves (tonal characteristic curves), for example, an arrangement of halftone dots (when letting the y values correspond to dot area % values) permits to make a proper evaluation, to a picture quality of a finally obtained reproduced picture, prior to proofing.

To the contrary, the D axis color-separation curve permits to obtain curves corresponding to the respective color-film originals, but they do not converge into a single curve on the D axis when adjusted to the same D axis range, as mentioned before. That is, each of the D axis color-separation curve shows only choices in tonal conversion. Consequently, according to the respective D axis color-separation curves, proofings are necessary to make proper judgements whether a predetermined tonal conversion can be carried out or a reproduced picture in desired quality can be produced.

Relating to the above point, the characteristics of the tonal conversion formula (1) of this invention permit a shape of the tonal characteristic curve to be rationally altered, that is, the operator who manages the tonal conversion work can adjust (modify, alter) a tone of the reproduced picture to a desired one, using the tonal conversion formula of this invention, namely, he can do it, based on the X axis color-separation curve.

Having been described features and characteristics of a tonal adjusting mechanism for pictures as a core of the picture producing apparatus of this invention, taking a production of a printed picture as a chief example, there is no difference between a manner for producing a printed picture by means of a scanner (monochrome or color) and a manner for producing a reproduced picture by means of another picture producing apparatus such as a reproducing (copying) machine or the like. However, in the conventional picture producing apparatus, an original is first recorded or stored in a density information read-out mechanism (recording medium system such as CCD) to form a medium image (a transient being possible, of course), a reproduced picture is then produced on the basis of density information values obtained therefrom.

As such a recording medium, a various photoelectric transfer device is used depending upon the type of a picture producing apparatus, such as two dimensional CCD, photomultiplier, photodiode, CCD, etc. Such recording medium allows imaging (picking-up) by picture information values correlating to incident light intensity from an original picture into the recording medium system, as similarly as photographic materials. Since each of these recording media having its own density characteristic curve (photoelectric transfer characteristic curve), when producing a reproduced picture from a medium image recorded on one of these recording media, the density characteristic curve (photoelectric transfer characteristic curve) of the used recording medium is utilized, like in the case of a color-film original, to determine basic light intensity (X), thereby conducting a tonal conversion according to the tonal conversion formula (1).

On the other hand, a picture producing apparatus of this invention permits to use a color-film original (negative type) recorded on a photographic material (recording medium herein called), as an object of reproduction (copy). In the above case, when density information values obtained from a density measuring mechanism (CCD constitution, for example) of a picture producing apparatus are converted into picture information values correlating light intensity, there might arise a problem either which should be used, a photoelectric transfer characteristic curve of the CCD or a photographic characteristic curve. Either one may be used to determine the picture information values correlating to light intensity. However, in the case of a monochrome- or color-film original, employment of the photographic characteristic curve might yield a better outcome, if desired to get a reproduced one closer to the genuine object for reproduction (copy) or the subject (real image) as being the base of a medium picture recorded on a recording medium, namely, a photographic material. The same is true in the case of production of a reproduced picture of which quality is closer to the picked-up image (real image) from a video (TV) picture or a medium picture. A picture picked-up on a CRT becomes a medium image (in this case, a given pick-up device assumed to be a recording medium), when a still picture is an object for the reproduction.

When a reproduced picture is produced according to the present invention, any conventional recording medium such as photodiode, CCD, etc. constituting said recording medium system, is sufficient as far as its own density characteristic curve (photoelectric transfer characteristic curve) can be defined. Whereby a reproduced picture having an excellent tone (gradation, color-tone) may be formed. As being made a lot of effort to improve the characteristics (photosensitive characteristics, photoelectric transfer characteristics) of various recording media for the purpose of producing a reproduced picture in high-quality, the present invention does not always require a high-grade or high-performance of the recording media, but a performance (characteristics) of the conventionals is sufficient. This is proved when the tonal conversion method according to the present invention is incorporated in a ink jet printer, as shown as another feature of this invention.

As having been described, the picture produced apparatus according to the present invention is incorporated with a hardware or a software in the tonal adjusting mechanism part thereof for conducting a tonal conversion based on the tonal conversion formula (1) so as to obtain a reproduced picture having an excellent reproducibility in not only gradation but also color-tone, or to obtain a reproduced picture having a quality which has been arbitrary corrected or altered.

It is, of course, sufficient that y values obtained by an arithmetic process of the tonal conversion formula (1) are adjusted to a density representing system (variable dot system, constant dot system, variable density dot) suitable for each picture producing apparatus.

Figures 4A, 4B:
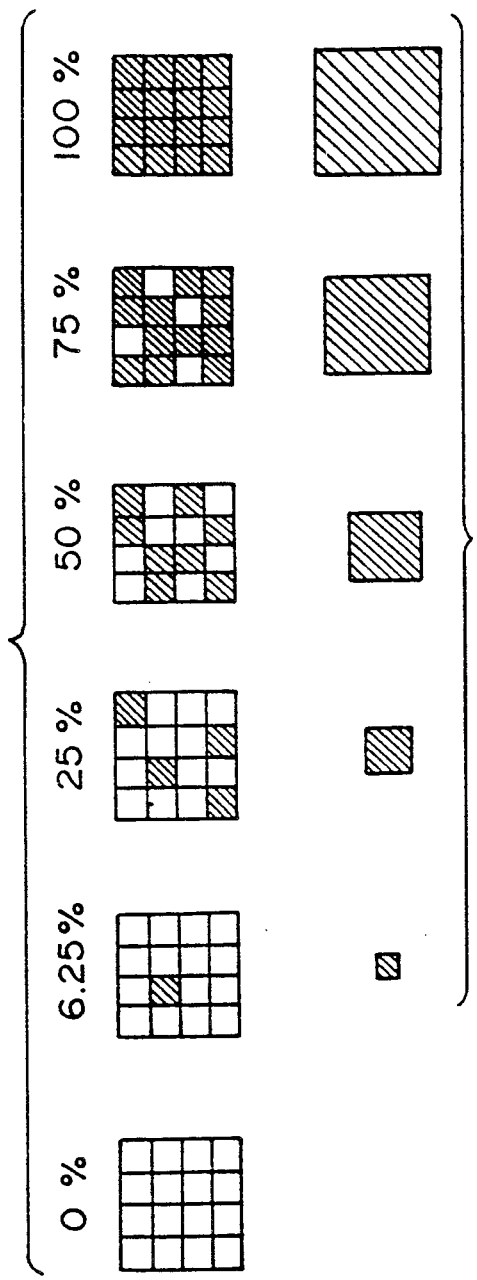
FIG. 4(a) shows examples when gradations of an original picture having a continuous tone are expressed by distribution of pixels in a pixel block.
FIG. 4(b) shows examples when the gradations corresponding to FIG. 4(a) are expressed by size of a halftone dot in photomechanical process.

As shown in FIG. 4, for example, in the row of (a), distribution of pixels recorded in a given pixel block are such that each of the pixels take positions dispersed with each other when increasing their number. In another example, the pixels are arranged in a spiral pattern, extending outward from the center of the pixel block successively with increase of their number. This manner is similar to in the case of halftone dot in a photomechanical process. In the row of (b) of FIG. 4, there are shown halftone dots each having an area corresponding to the number of pixels shown in (a).

This pixel block is of a matrix type with $4 \times 4$ to express the tone in 17 stages. In general, a pixel block of a nxn matrix type expresses the tone in $n^2+1$ (0-100%) stages.

Such the method to express the gradation of an original picture such as a continuous-tone picture by distribution of pixels positioned in a pixel block of a matrix type is called as a dither matrix method, as well known (Japanese Patent Laid-Open Publication Nos. 58-85454, 58-114569, 59-52969, 60-141585, 62-186663, etc.)

DETAILED DESCRIPTION OF PREFERRED EMBODIMENTS

Hereinafter will be described the present invention in detail based on preferred embodiments, it should be noted that the present invention is not limited thereto.

The most remarkable feature of this invention lies in a point that a tonal conversion of a picture, which is a core of production of a reproduced picture by a picture producing apparatus, is conducted based on the tonal conversion formula (1). Now will be described an example for setting an X axis color-separation curve (tonal characteristic curve), which curve determines a quality of a reproduced picture or the final product. Initially will be described examples for setting the X axis color-separation curve according to this invention and the conventional D axis color-separation curve. Description will be also made about a difference between them. Secondary, will be described a picture producing apparatus having a tone adjusting mechanism part incorporated therein a hardware or a software for conducting a tonal conversion based on the tonal conversion formula (1) of this invention.

EXAMPLE 1: SETTING AN X AXIS COLOR-SEPARATION CURVE (1) A density characteristic curve used in the experiment A photographic density characteristic curve (Fuji Chrome (tradename), manufactured by Fuji Photo Film Co., Ltd.) shown in FIG. 1 (D-X orthogonal coordinates) was used as a density characteristic curve. In FIG. 1, the D axis (vertical axis) represents density values of a color original. On the other hand, X axis represents light exposure ($\log E = \log I \times t$) relating to the photographic characteristic curve, numerated on the same scaling as the D axis. Functional formulae listed in Table 1 were used for the photographic density curve.

(2) Experimental original

General color-film originals (medium picture) have various picture qualities, diversified depending on the exposure conditions upon photographing, such as standards (appropriately exposed), non-standards (over- or under-exposed), etc. To examine if the present invention can rationally comply with such the color-film originals with various qualities, the experiment was made with color-film originals having different density ranges (DR), i.e., different on the D axis.

(3) Calculation of data for setting the X axis color-separation curve

Using the formulae listed in Table 1 where the photographic haracteristic curve in FIG. 1 is expressed as functional formulae, $D_n$ values on the D axis of the various color-film originals were converted into $X_n$ values on the X axis. The $X_n$ values were then converted into tonal intensity values (y value), based on the tonal conversion formula (1).

Incidentally, operational conditions of the tonal conversion formula (1) are as follows:

$x = X_n - X_{H\,n}$;

$y_H = 5\%,\ y_S = 95\%$;

$\gamma = 1.00,\ \beta = 10^{-\gamma} = 0.1,\ \alpha = 1.00$; and $k = \gamma / X_{S\,n} - X_{H\,n}$.

(in the case of following Table 2(1), $X_{H\,n} = 0.4781$ and $X_{S\,n} = 2.2300$; in another case, refer to Table 2.) Results are listed in Table 2.

In Table 2, (1) to (3) shows data of an over-exposed (light colored original), (4) to (7) shows of an appropriately-exposed, and (8) to (9) shows of an under-exposed (dark colored original), respectively.

TABLE 2

| Step No. | Dn | Xn | Dn' | Xn' | y value |
|---|---|---|---|---|---|

Data for setting an X axis color-separation curve for an original color picture over-exposed (I):

(1) DR = 0.18–2.70

| | | | | | |
|---|---|---|---|---|---|
| 1 | 0.1800 | 0.4781 | 0.0000 | 0.0000 | 5.0000 |
| 2 | 0.4950 | 0.9952 | 0.3125 | 0.7379 | 54.3196 |
| 3 | 0.8100 | 1.2418 | 0.6250 | 1.0898 | 68.3495 |
| 4 | 1.1250 | 1.4675 | 0.9375 | 1.4119 | 77.7579 |
| 5 | 1.4400 | 1.6628 | 1.2500 | 1.6906 | 83.9254 |
| 6 | 1.7550 | 1.8122 | 1.5625 | 1.9038 | 87.6827 |
| 7 | 2.0700 | 1.9494 | 1.8750 | 2.0995 | 90.5389 |
| 8 | 2.3850 | 2.0817 | 2.1875 | 2.2883 | 92.8471 |
| 9 | 2.7000 | 2.2300 | 2.5000 | 2.5000 | 95.0000 |
| Range | 2.5200 | 1.7519 | 2.5000 | 2.5000 | 90.0000 |

(2) DR = 0.27–2.70

| | | | | | |
|---|---|---|---|---|---|
| 1 | 0.2700 | 0.6967 | 0.0000 | 0.0000 | 5.0000 |
| 2 | 0.5738 | 1.0576 | 0.3125 | 0.5884 | 46.8379 |
| 3 | 0.8775 | 1.2945 | 0.6250 | 0.9747 | 64.2507 |
| 4 | 1.1813 | 1.5024 | 0.9375 | 1.3137 | 75.1792 |
| 5 | 1.4850 | 1.6907 | 1.2500 | 1.6207 | 82.5239 |
| 6 | 1.7888 | 1.8271 | 1.5625 | 1.8431 | 86.6870 |
| 7 | 2.0925 | 1.9589 | 1.8750 | 2.0580 | 89.9577 |
| 8 | 2.3963 | 2.0864 | 2.1875 | 2.2659 | 92.5938 |
| 9 | 2.7000 | 2.2300 | 2.5000 | 2.5000 | 95.0000 |
| Range | 2.4300 | 1.5333 | 2.5000 | 2.5000 | 90.0000 |

(3) DR = 0.39–2.70

| | | | | | |
|---|---|---|---|---|---|
| 1 | 0.3900 | 0.8860 | 0.0000 | 0.0000 | 5.0000 |
| 2 | 0.6788 | 1.1345 | 0.3125 | 0.4704 | 40.1604 |
| 3 | 0.9675 | 1.3647 | 0.6250 | 0.8969 | 61.2236 |
| 4 | 1.2563 | 1.5489 | 0.9375 | 1.2382 | 73.0317 |

TABLE 2-continued

| Step No. | Dn | Xn | Dn' | Xn' | y value |
|---|---|---|---|---|---|
| 5 | 1.5450 | 1.7198 | 1.2500 | 1.5548 | 81.1175 |
| 6 | 1.8338 | 1.8469 | 1.5625 | 1.7903 | 85.7832 |
| 7 | 2.1225 | 1.9715 | 1.8750 | 2.0211 | 89.4561 |
| 8 | 2.4113 | 2.0927 | 2.1875 | 2.2457 | 92.3608 |
| 9 | 2.7000 | 2.2300 | 2.5000 | 2.5000 | 95.0000 |
| Range | 2.3100 | 1.3494 | 2.5000 | 2.5000 | 90.0000 |

Data for setting an X axis color-separation curve for an original color picture nearly appropriately-exposed (II):

(4) DR = 0.20–2.70

| | | | | | |
|---|---|---|---|---|---|
| 1 | 0.2000 | 0.5371 | 0.0000 | 0.0000 | 5.0000 |
| 2 | 0.5125 | 1.0098 | 0.3125 | 0.6981 | 52.4273 |
| 3 | 0.8250 | 1.2535 | 0.6250 | 1.0580 | 67.2602 |
| 4 | 1.1375 | 1.4753 | 0.9375 | 1.3855 | 77.0874 |
| 5 | 1.4500 | 1.6690 | 1.2500 | 1.6716 | 83.5533 |
| 6 | 1.7625 | 1.8155 | 1.5625 | 1.8879 | 87.4272 |
| 7 | 2.0750 | 1.9515 | 1.8750 | 2.0888 | 90.3957 |
| 8 | 2.3875 | 2.0828 | 2.1875 | 2.2827 | 92.7843 |
| 9 | 2.7000 | 2.2300 | 2.5000 | 2.5000 | 95.0000 |
| Range | 2.5000 | 1.6929 | 2.5000 | 2.5000 | 90.0000 |

(5) DR = 0.30–2.80

| | | | | | |
|---|---|---|---|---|---|
| 1 | 0.3000 | 0.7505 | 0.0000 | 0.0000 | 5.0000 |
| 2 | 0.6125 | 1.0878 | 0.3125 | 0.5513 | 44.8161 |
| 3 | 0.9250 | 1.3315 | 0.6250 | 0.9496 | 63.2977 |
| 4 | 1.2375 | 1.5373 | 0.9375 | 1.2860 | 74.4086 |
| 5 | 1.5500 | 1.7220 | 1.2500 | 1.5879 | 81.8346 |
| 6 | 1.8625 | 1.8595 | 1.5625 | 1.8127 | 86.1670 |
| 7 | 2.1750 | 1.9935 | 1.8750 | 2.0317 | 89.6071 |
| 8 | 2.4875 | 2.1248 | 2.1875 | 2.2463 | 92.3678 |
| 9 | 2.8000 | 2.2800 | 2.5000 | 2.5000 | 95.0000 |
| Range | 2.5000 | 1.5295 | 2.5000 | 2.5000 | 90.0000 |

(6) DR = 0.50–2.80

| | | | | | |
|---|---|---|---|---|---|
| 1 | 0.5000 | 1.0000 | 0.0000 | 0.0000 | 5.0000 |
| 2 | 0.7875 | 1.2243 | 0.3125 | 0.4381 | 38.2025 |
| 3 | 1.0750 | 1.4365 | 0.6250 | 0.8525 | 59.3963 |
| 4 | 1.3625 | 1.6148 | 0.9375 | 1.2008 | 71.9112 |
| 5 | 1.6500 | 1.7660 | 1.2500 | 1.4961 | 79.7007 |
| 6 | 1.9375 | 1.8925 | 1.5625 | 1.7431 | 84.9202 |
| 7 | 2.2250 | 2.0145 | 1.8750 | 1.9814 | 88.8772 |
| 8 | 2.5125 | 2.1363 | 2.1875 | 2.2193 | 92.0497 |
| 9 | 2.8000 | 2.2800 | 2.5000 | 2.5000 | 95.0000 |
| Range | 2.3000 | 1.2800 | 2.5000 | 2.5000 | 90.0000 |

(7) DR = 0.30–3.00

| | | | | | |
|---|---|---|---|---|---|
| 1 | 0.3000 | 0.7505 | 0.0000 | 0.0000 | 5.0000 |
| 2 | 0.6375 | 1.1073 | 0.3125 | 0.5293 | 43.5842 |
| 3 | 0.9750 | 1.3705 | 0.6250 | 0.9197 | 62.1333 |
| 4 | 1.3125 | 1.5838 | 0.9375 | 1.2361 | 72.9698 |
| 5 | 1.6500 | 1.7660 | 1.2500 | 1.5064 | 80.0288 |
| 6 | 1.9875 | 1.9145 | 1.5625 | 1.7276 | 84.6146 |
| 7 | 2.3250 | 2.0565 | 1.8750 | 1.9373 | 88.2089 |
| 8 | 2.6625 | 2.2113 | 2.1875 | 2.0087 | 89.2776 |
| 9 | 3.0000 | 2.4358 | 2.5000 | 2.5000 | 95.0000 |
| Range | 2.7000 | 1.6853 | 2.5000 | 2.5000 | 90.0000 |

Data for setting an X axis color-separation curve for an original color picture over-exposed (II):

(8) DR = 0.60–3.00

| | | | | | |
|---|---|---|---|---|---|
| 1 | 0.6000 | 1.0780 | 0.0000 | 0.0000 | 5.0000 |
| 2 | 0.9000 | 1.3120 | 0.3125 | 0.4308 | 38.1964 |
| 3 | 1.2000 | 1.5140 | 0.6250 | 0.8028 | 57.2603 |
| 4 | 1.5000 | 1.7000 | 0.9375 | 1.1452 | 70.1727 |
| 5 | 1.8000 | 1.8320 | 1.2500 | 1.3883 | 77.1593 |
| 6 | 2.1000 | 1.9620 | 1.5625 | 1.6276 | 82.6663 |
| 7 | 2.4000 | 2.0880 | 1.8750 | 1.8596 | 86.9632 |
| 8 | 2.7000 | 2.2300 | 2.1875 | 2.1211 | 90.8238 |
| 9 | 3.0000 | 2.4358 | 2.5000 | 2.5000 | 95.0000 |
| Range | 2.4000 | 1.3578 | 2.5000 | 2.5000 | 90.0000 |

(9) DR = 0.60–3.10

| | | | | | |
|---|---|---|---|---|---|
| 1 | 0.6000 | 1.0780 | 0.0000 | 0.0000 | 5.0000 |
| 2 | 0.9125 | 1.3218 | 0.3125 | 0.4126 | 36.6151 |
| 3 | 1.2250 | 1.5295 | 0.6250 | 0.7642 | 55.5325 |
| 4 | 1.5375 | 1.7165 | 0.9375 | 1.0807 | 68.0410 |
| 5 | 1.8500 | 1.8540 | 1.2500 | 1.3134 | 75.1709 |
| 6 | 2.1625 | 1.9883 | 1.5625 | 1.5407 | 80.8053 |
| 7 | 2.4750 | 2.1195 | 1.8750 | 1.7627 | 85.2794 |
| 8 | 2.7875 | 2.2738 | 2.1875 | 2.0237 | 89.4932 |
| 9 | 3.1000 | 2.5551 | 2.5000 | 2.5000 | 95.0000 |
| Range | 2.5000 | 1.4771 | 2.5000 | 2.5000 | 90.0000 |

(10) DR = 0.60–3.17

TABLE 2-continued

| Step No. | Dn | Xn | Dn' | Xn' | y value |
|---|---|---|---|---|---|
| 1 | 0.6000 | 1.0780 | 0.0000 | 0.0000 | 5.0000 |
| 2 | 0.9213 | 1.3286 | 0.3125 | 0.3848 | 34.8415 |
| 3 | 1.2425 | 1.5404 | 0.6250 | 0.7100 | 53.0004 |
| 4 | 1.5638 | 1.7281 | 0.9375 | 0.9982 | 62.1232 |
| 5 | 1.8850 | 1.8694 | 1.2500 | 1.2151 | 72.3442 |
| 6 | 2.2063 | 2.0066 | 1.5625 | 1.4258 | 78.1044 |
| 7 | 2.5275 | 2.1438 | 1.8750 | 1.6364 | 82.8466 |
| 8 | 2.8488 | 2.3190 | 2.1875 | 1.9054 | 87.7082 |
| 9 | 3.1700 | 2.7062 | 2.5000 | 2.5000 | 95.0000 |
| Range | 2.5700 | 1.6282 | 2.5000 | 2.5000 | 90.0000 |

(4) X axis color-separation curve

Figure 2:
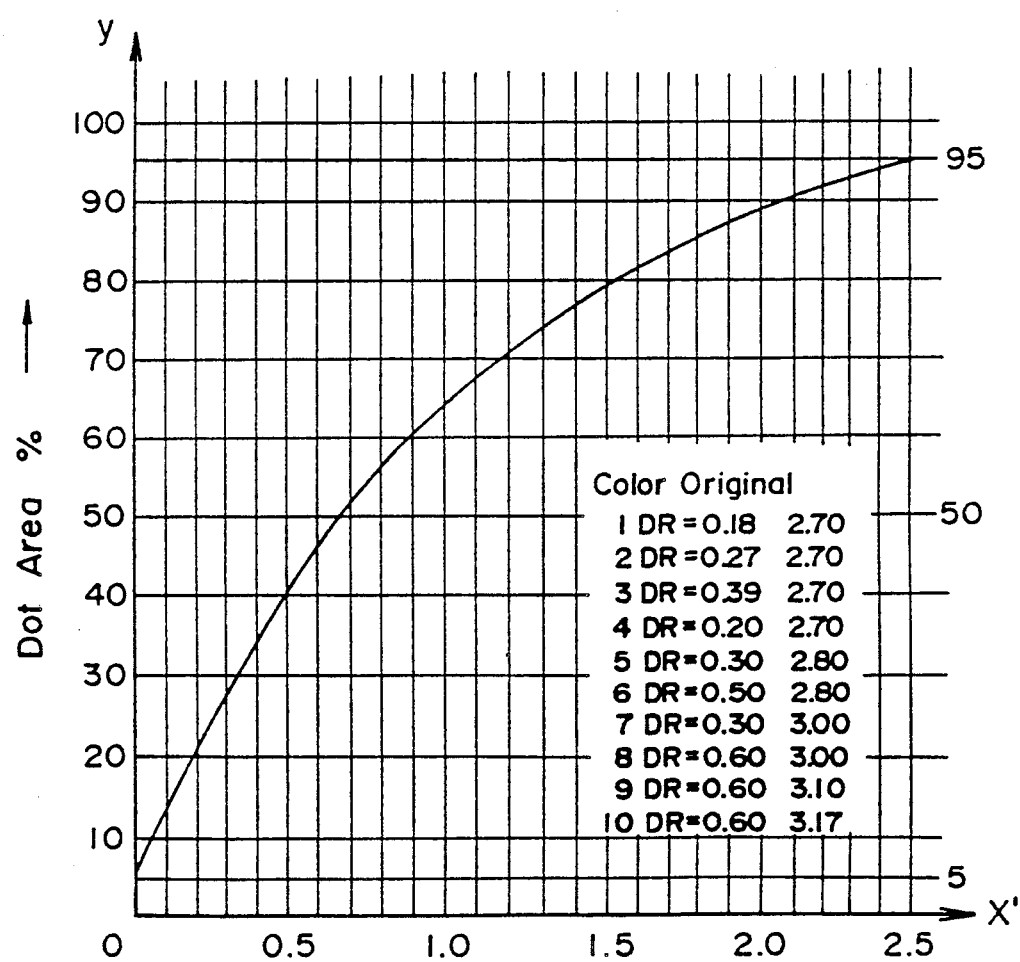
FIG. 2 is a graphical representation of an X axis color-separation curve (employed in a tonal conversion process according to the present invention) set, based on the photographic density characteristic curve of FIG. 1.
Figure 3:
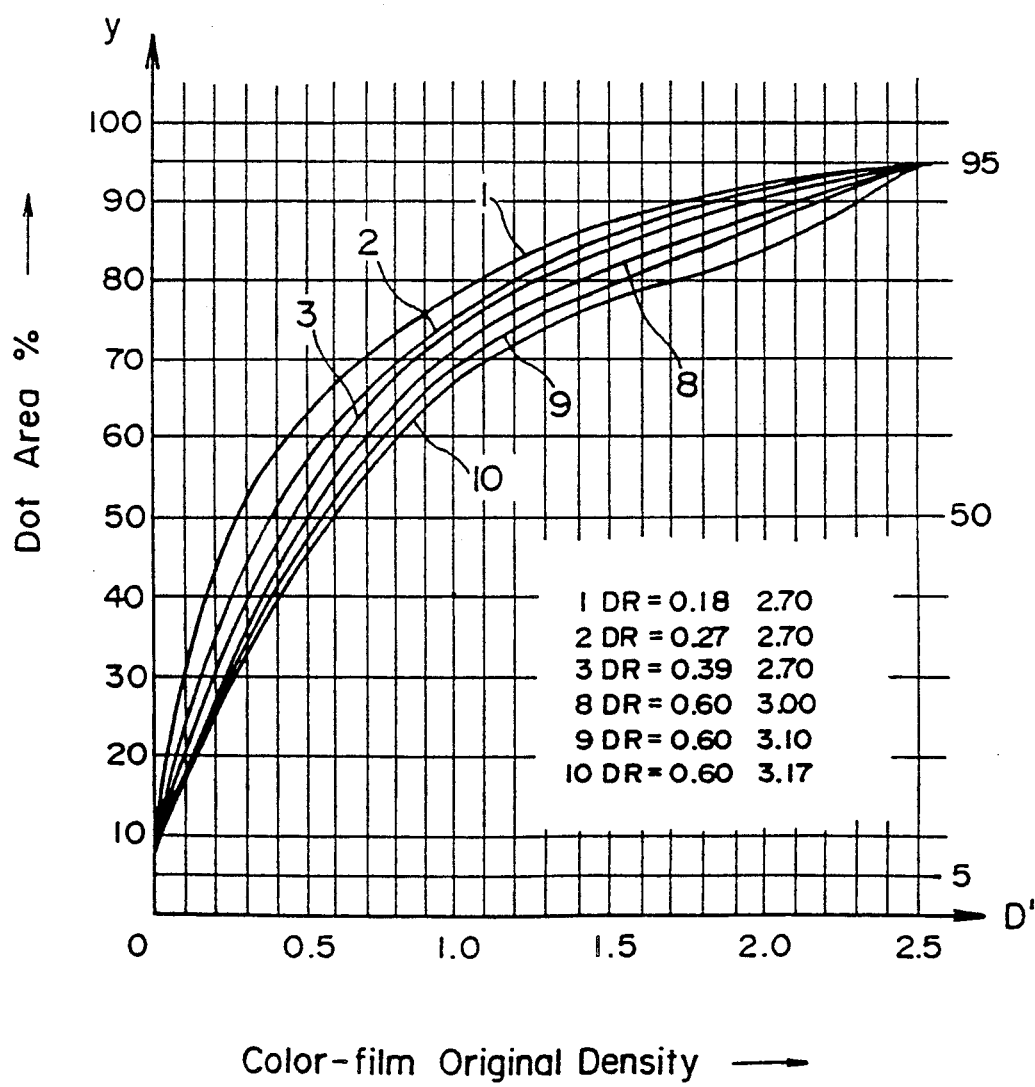
FIG. 3 is a graphical representation of a D axis color-separation curves (employed in the conventional tonal conversion process) set, based on the density characteristic curve of FIG. 1.

The data of Table 1 are shown in FIGS. 2 and 3. It should be paid attention to in that, in FIGS. 2 and 3, their horizontal axes have different characteristics, while the vertical axes represent the y values. The horizontal axis in FIG. 2 represents picture information values correlating to light intensity, though the horizontal axis in FIG. 3 represents density values of a color-film original. Upon graphically representing, adopted were values adjusted to the same range relating to light intensity and density (2.5000 in this case), for the sake of convenience in comparison. These adjusted values are shown in Table 2, as $(D_n \rightarrow) D_n'$, $(X_n \rightarrow) X'$. In the case of Table 2(1), the adjustment of $D_n \rightarrow D_n'$ is done as follows:

$$Dn' = (Dn - 1.800) \times \frac{\text{(adjustment range)}}{DRn}$$
$$= (Dn - 1.800) \times \frac{2.50}{2.52}$$

In the similar manner, $X_n \rightarrow X_n'$ is done as follows:

$$Xn' = (Xn - 0.4781) \times \frac{2.500}{1.7519}$$

FIG. 2 shows a tonal characteristic curve according to this invention, namely, an X axis color-separation curve (relationship between $X_n'$ and y, as mentioned before), and FIG. 3 shows a D axis color-separation curve (showing a relationship between $D_n'$ and y, as mentioned before, and considered to be an example of setting a conventional color-separation curve).

Obvious from FIGS. 2 and 3, it can be seen an unbelievable fact that, even if color-film originals having any qualities are used, all of the X axis color-separation curves converge into a single, identical curve as shown in FIG. 2, whenever $\alpha$, $y_H$, $y_S$ and $\gamma$ in the tonal conversion formula (2) take the same value, furthermore the tone of a reproduced color pictures, which will be obtained after conducted color-separation process, are uniformly represented. In other words, the technique for setting a tonal characteristic curve (X axis color-separation curve) according to the present invention provides a tonal characteristic curve which permits to produce a reproduced picture of the same quality, namely, having the same arrangement of the y values, whatever quality the original picture has. In addition, the technique permits the operator, who intends to produce a reproduced picture using a picture producing apparatus, to alter the X axis color-separation curve, obtained in the manner described previously, into a desired shape by varying the parameters in the tonal conversion formula (1), particularly the $\gamma$ value. That is, he can rationally manage the tone so as to obtain a desired quality or tone on the basis of the X axis color-separation curve.

To the contrary, as shown in an example of setting conventional color-separation curves in FIG. 3, there are provided D axis color-separation curves each corresponding to qualities of the respective original color-film pictures, but it is impossible to accurately known beforehand from the D axis color-separation curves whether all color-printed pictures, which will be produced after conducted color-separation, have the same tone. That is, a technique using the conventional D axis color-separating curve therein has a disadvantage that a judgement to whether a final product has appropriate quality and tone can make only after actual proofing.

This means that there is necessitated, in a color-separation work by using a picture producing apparatus, a set-up work to choose an appropriate one among a number of color-separation curves, a ganging work which should be done prior to the set-up work, etc. Therefore, a conventional technique for setting a D axis color-separation curve does not allow an efficient operation and management of the tonal conversion work.

EXAMPLE 2: PICTURE PRODUCING APPARATUS

A picture producing apparatus according to the present invention will be described, referring to FIG. 5 to 10.

Figure 5:
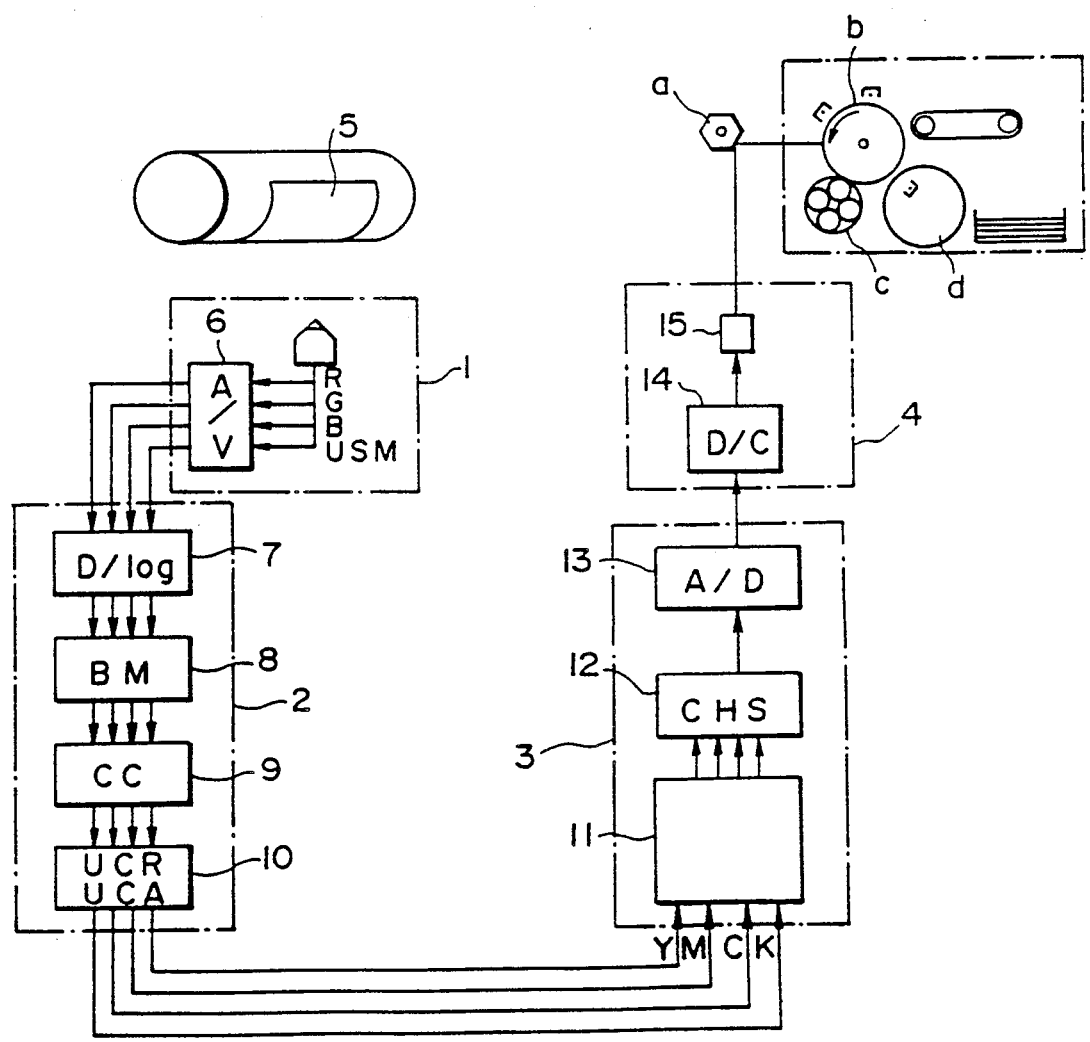
FIG. 5 is a block diagram of a picture producing apparatus of the first embodiment according to the present invention.

FIG. 5 is a block diagram of a picture producing apparatus of the first embodiment according to the present invention.

As shown in FIG. 5, an apparatus of this invention comprises a detecting part (1) for separating transmitted or reflected light emitted from an original into red (R), green (G) and blue (B) lights to read them out, a color-separation part (2) for converting the output signals from the detecting part (1) into color-separation signals of yellow (Y), magenta (M), cyan (C) and black (K), tone adjusting part (3) for determining a gradation expressed by appropriate distribution of pixels, and operating the tonal conversion formula (1), and an output part (4) for exposing an electronic photosensitive material by laser beam based on the output signals from the tone adjusting part (3), whereby a latent image formed on a photosensitive means (b) is developed in a developing part (C) to become a toner image, transferred on a recording sheet, then fixed in a fixing part.

The transferring and fixing to the recording sheet may be carried out in the conventional manner. That is, the steps of fixing and transferring are carried out in such a manner that the toner images of each color are formed by the photosensitive means and developing parts respectively provided for each compositional color are successively transferred onto a recording sheet, or that a latent image of each color formed on a single photosensitive means is developed to become a toner image and tranferred onto a recording sheet, and this process is repeated for each color. In FIG. 5, a polygon mirror (a) is rotated at a high speed to image picture information on the photosensitive means (b) in order to form a latent image, the formed latent image is developed in the developing part (c) and a picture is formed on the recording sheet by a transfer cylinder (d).

The detecting part (1) detects transmitted or reflected light from each part of the original picture (5) by means of a photoelectric transfer device such as a photomultiplier, a solid state pick-up device (CCD), etc., outputs R, G, B, USM signals as electric currents, and convert them into voltage signals in an A/V converting part (6).

The color-separation part (2) has a logarithmic amplifier (7) which logarithmically calculate the voltage signals for each R, G, B, USM outputted from the detecting part (1), and a basic masking part (BM) (8) which separates a black (K) component out of the information relating to density and further separates components of Y, M and C from each other. That is, in the picture producing apparatus of this invention, an object for reproduction (original for printing) is recorded or stored in a picture information read-out mechanism made up of a photomultiplier or a CCD in the detecting part (1), and density information values ($D_n$) are obtained as picture information of the reproduction object in the color-separating part (2). As previously described, the density information values ($D_n$) are obtained for each color, respectively. The obtained density information values ($D_n$) are then converted into picture information values ($X_n$) relating to light intensity by utilizing the photoelectric transfer characteristic curve of CCD, as being a recording medium, and further into basic light intensity values (X). This process may be carried out in a software or hardware, not shown. Alternatively, a function for obtaining the picture information values ($X_n$) or the like correlating to light intensity from the density information value ($D_n$) may be incorporated in the adjusting part (11).

FIG. 5 also shows a color-correcting (CC) part (10) constituting a part of the color-separating part (2), which color-correcting part (10) controls Y, M and C components for each original picture colors of R, G and B, and, Y, M and C. UCR (under color removal) or UCA (under color addition) of a UCR/UCA part (10) determines a ratio of three components, Y, M and C, to express the black component of the original picture. The Y, M, C and K components are converted into the picture information values correlating to light intensity to determine area ratios, ye', me', ce' and ke', to be occupied by pixels of each components in a gradation controlling part in a tonal adjusting part (IMC), as seen in a conventional picture information apparatus, then the ye', me', ce' and ke' are subjected to inverse logarithmic transformation. In this embodiment, the adjusting part (11) carries out conversion of Y, M, C and K into ye', me', ce' and ke', instead of the gradation control part and inverse logarithmic transforming part. The adjusting part (11) has algorithm of the tonal conversion formula (1) therein to apply the tonal conversion formula (1) to the Y, M, C and K, respectively so as to obtain ye', me' ce' and ke'.

The adjusting part (11) may be taken in a various form such as a general-purpose computer retaining the algorithm of the tonal conversion formula (1) as a software and I/F (interface) of A/D and D/A, an electric circuit embodying the algorithm as an internal logic by using a general-purpose IC, a PAL, a gate alley, a custom IC, etc. embodying the algorithm as the internal logic, etc. In order to form a picture corresponding to the density of the original picture by the laser beam, the diameter and intensity of the laser beam is kept constant, as afore-described, and the number of unit pixels and their distribution formed in a picture block, corresponding to area of halftone dot in photomechanical process, are calculated, their data are then outputted.

The area ratio of the pixels (tonal intensity value) obtained in the adjusting part (11) are inputted to a color-channel selector (12) to be successively and selectively outputted as ye', me', ce' and ke'. The outputs are A/D-converted in the A/D conversion part (13) to be inputted to an output part (4). The output part (4) has a dot-control part (14) to control the laser beam based on the outputs from the tone adjusting part (3).

Figure 6:
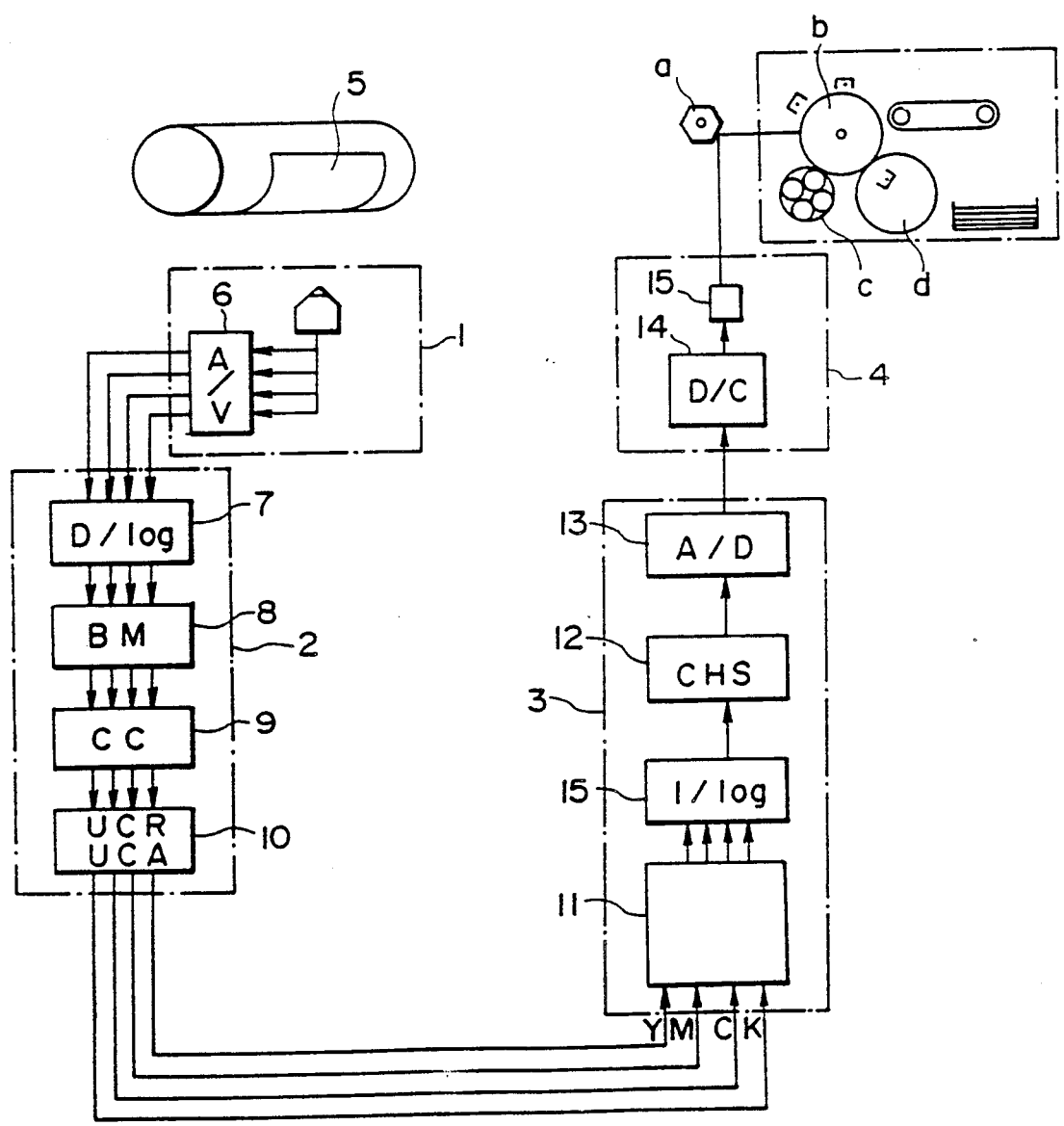
FIG. 6 is a block diagram of a picture producing apparatus of the second embodiment according to the present invention.

FIG. 6 shows another picture producing apparatus according to the second embodiment of this invention, in which a conventional inverse logarithmic transforming part (7) is also employed, therefore the ye', me', ce' and ke' are outputted as a form of logarithmic values in the adjusting part (11). This permits the tonal conversion formula (1) to be applied by changing only one constitutional element in a conventional apparatus so that the conventional system can be converted into a system according to this invention with less change than the first embodiment.

Figure 7:
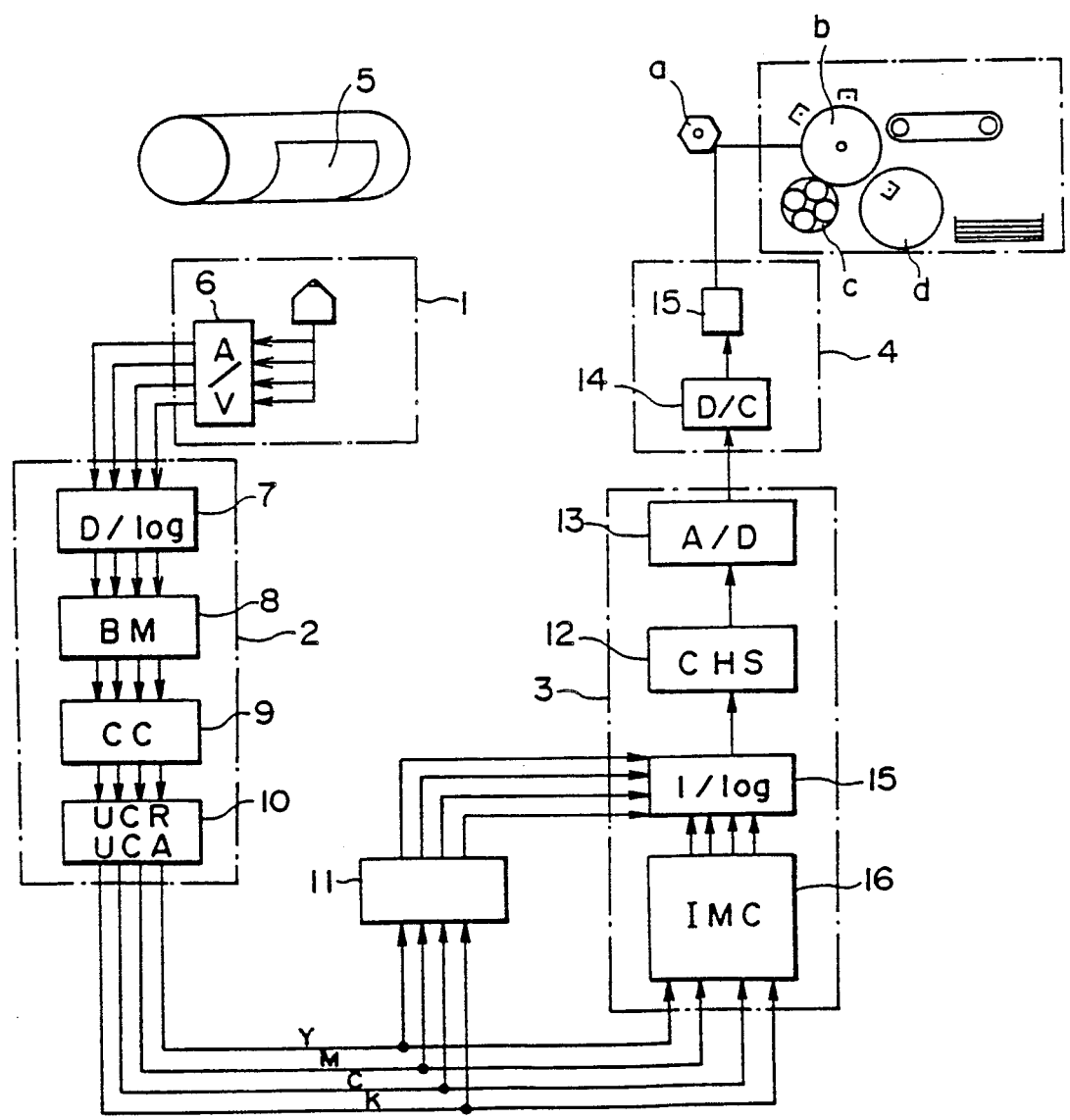
FIG. 7 is a block diagram of a picture producing apparatus of the third embodiment according to the present invention.

FIG. 7 shows still another picture producing apparatus of the third embodiment, in which the conventional gradation control (IMC) part (16) is also employed, and the inverse logarithmic transforming part (15) and the gradation control part (16) are broken their connection. An adjusting part (11) for outputting ye', me', ce' and ke' as logarithmic values is also employed as similar as in the second embodiment. The adjusting part (11) pickes up Y, M, C and K signals ahead of the gradation control part (16) and outputs the converted values to the inverse logarithmic transforming part (15).

Figure 8:
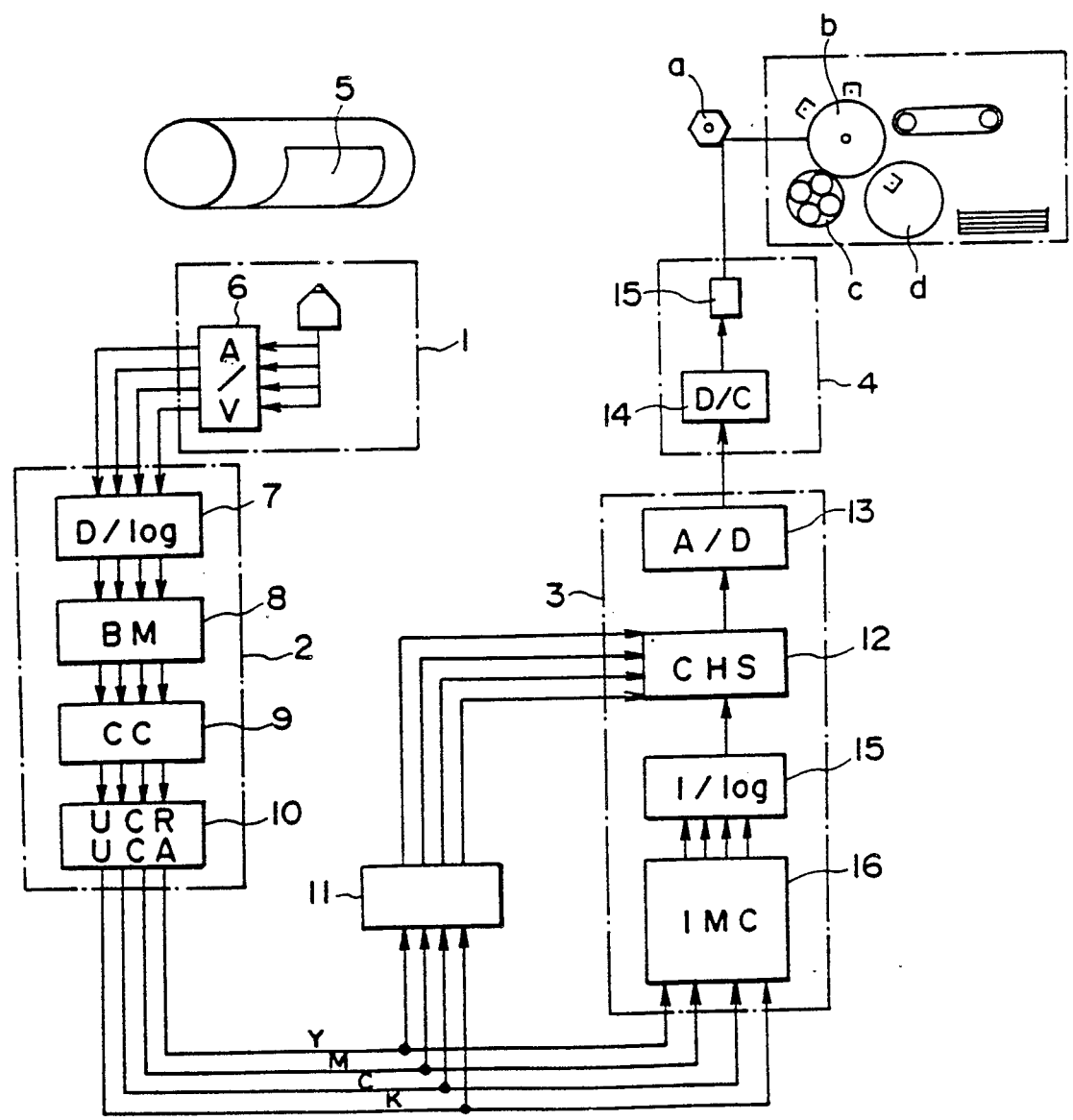
FIG. 8 is a block diagram of a picture producing apparatus of the fourth embodiment according to the present invention.

FIG. 8 shows still another picture producing apparatus of the fourth embodiment, in which the inverse logarithmic transforming part (15) and a color-channel selector (12) are also employed and the connection therebetween is broken. That is, an adjusting part (11) pickes up Y, M, C and M signals ahead of a gradation control part (16) and is directly connected to the color-channel selector (12) so that ye', me', ce' and ke' may be determined in the most suitable processing form as to the same degree as in the adjusting part of the first embodiment. A slight modification added to a conventional apparatus allows realization of the system, as same as in the third embodiment.

Figure 9:
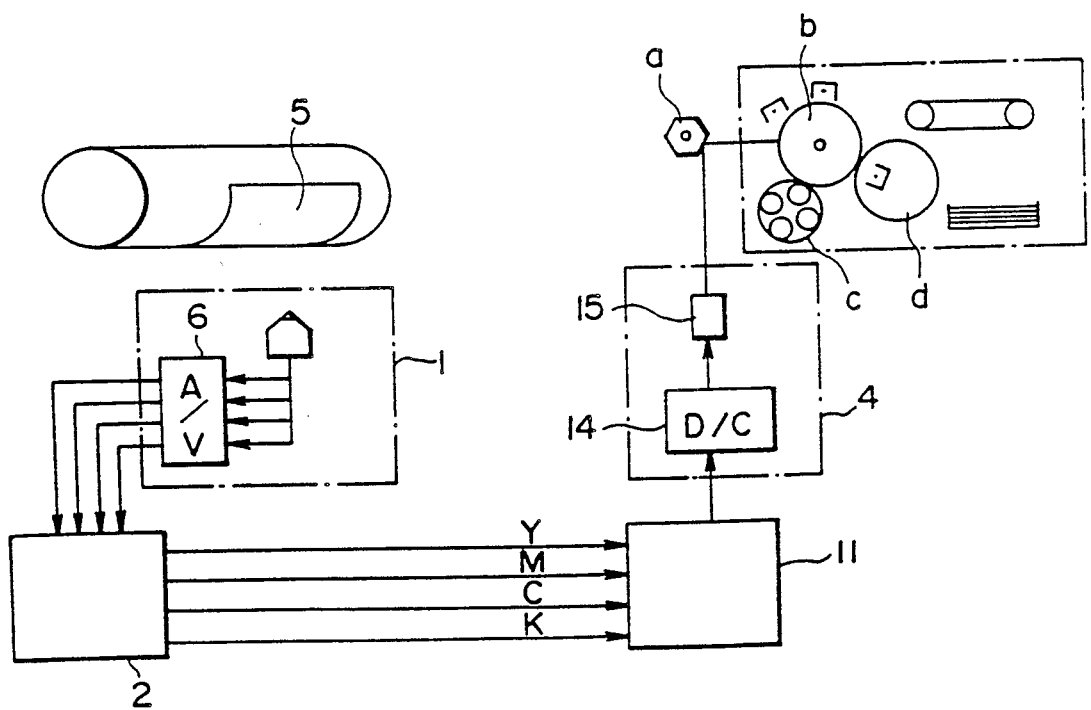
FIG. 9 is a block diagram of a picture producing apparatus of the fifth embodiment according to the present invention.

FIG. 9 shows another picture producing apparatus of the fifth embodiment, in which the conventional tonal converting part is entirely replaced with a new adjusting part (11), where the tonal conversion formula (1) can be operated.

Picture forming part shown in FIG. 5 to 9 are of an electrophotographic type, which forms a electrostatic latent image by laser beam scanning on a photosensitive means having photoconductivity. However, another means of a electrostatic recording type, magnetic recording type, or the like, is employable, as means for forming a record picture expressed by distribution of pixels.

Figure 10:
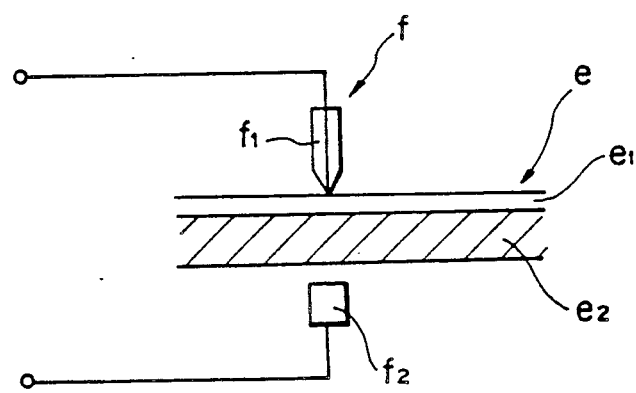
FIG. 10 is a schematic illustration of a picture forming part of a electrostatic recording type.

In the type of electrostatic recording as shown in FIG. 10, a recording head (f), having a number of electrode arranged in a direction perpendicular to a traveling direction of the head (f), is moved close to or in contact with a recording means having a moving dielectric in a sheet-like form to form a electrostatic latent image thereon by applying a voltage to each of the electrodes. The recording means (e) comprises a recording layer (dielectric) (e1) and a base layer (e2). The recording head (f) comprises a recording electrode (f1) and an opposed electrode (control electrode) (f2) opposing thereto. Steps after application of toner to the so-formed latent image and development thereof are the same to those of in a electrophotographic type. The recording head (f), which is a collection of electrodes, is applied a voltage, as output signals corresponding to a picture to be recorded, from a dot control part (14) in an output part (4).

In a magnetic recording type, a cylinder of which surface is covered with a magnetizer is employed as a recording means, a magnetic image is formed on a surface of the recording means by applying a voltage as picture information signals onto the magnetic recording head contacting with the surface of the cylinder, simultaneously moving the magnetic recording head relative to the surface of the recording body. The other steps are carried out similar to the case in an electrophotographic type, excepting application of toner of a magnetic material for development of the latent image.

As described above, to add modifications to the tone adjusting part of the conventional apparatus permits fusion of the tonal conversion formula (1) with another process, realization of reoptimization, high-speed operation and compactness of the system, and increase of cost performance per system.

Although the color-separation parts of the above embodiments have the structures similar to the conventional ones, there may be employed a color-separation part omitted the color-correction part (9) and the USR-/UCA part (10) thereon, if unnecessary, because of employment of the tonal conversion formula (1).

In the above descriptions of the embodiments relating to the picture producing apparatus, there are abbreviated descriptions of parts relating to generally-used effects, which have no direct relationship with this invention, such as unsharp masking, sharpness effect, etc.

What is claimed is:

1. A picture producing apparatus for producing a reproduced picture having middle tones on a recording sheet based on signals obtained by processing density information values of respective pixels of an original picture from a medium image of said picture recorded on a predetermined recording medium, said apparatus comprising a tone adjusting means for processing said density information and producing tonal intensity values by:

(1) converting the density information values ($D_n$ values) of the respective pixels on the original picture, by using a density characteristic curve defining a relationship between density information values (D values) of the recording medium and picture information values (X values) correlated to incident light intensities from the original picture into the recording medium, into picture information values ($X_n$ values) correlated to the light intensities corresponding to the density information values ($D_n$ values) of the respective pixels;

(2) converting the picture information values ($X_n$ values) correlated to said light intensities into tonal intensity values (y values) for tone adjustment by operating a tonal conversion formula:

$$y = y_H + \frac{\alpha(1 - 10^{-kX})}{\alpha - \beta}(y_S - y_H)$$

where

X: ($X_n - X_{H\,n}$), namely, a basic light intensity value obtained by substracting a picture information value ($XH_n$) correlated to a light intensity of a brightest part of the original picture obtained via the density characteristic curve from a density information value ($D_{H\,n}$) of a corresponding brightest part (H part) of the original picture, from a picture information value ($X_n$) correlated to a light intensity of a pixel obtained from a density information value ($D_n$ value) of a corresponding arbitrary pixel on the original picture by using the density characteristic curve;

y: a tonal intensity value set for a pixel on the reproduced picture corresponding to the arbitrary pixel on the original picture;

$y_H$: a tonal intensity value set in advance for the brightest part (H part) of the original picture;

$y_S$: a tonal intensity value set in advance for a darkest part (S part) of the original picture;

$\alpha$: a surface reflectance of a recording sheet sheet on which the reproduced image is to be formed;

$\beta$: a value determined by $\beta = 10^{-\gamma}$;

$$K: \frac{\gamma}{X_{Sn} - X_{Hn}}.$$

where $X_{s\,n}$ represents a picture information value ($X_{s\,n}$) correlated to a light intensity of the corresponding darkest part obtained via the density characteristic curve from the density information value ($D_{s\,n}$) of the darkest part (S) on the original picture;

$\gamma$: an arbitrary coefficient.

2. A picture producing apparatus according to claim 1 where the reproduced picture is a monochromatic picture.

3. A picture producing apparatus according to claim 1 where the reproduced picture is a multiple-colored picture.

4. A picture producing apparatus according to claim 1 where a latent image representing a distribution of the pixels is formed by laser beam on a picture forming means having a photoconductive layer uniformly charged, developed by toner, transferred onto a recording sheet, and fixed.

5. A picture producing apparatus according to claim 1 where a series, or a part of a series, of steps for forming a latent image on an image forming means, developing the latent image with toner, and transferring the developed image same to a recording sheet are carried out using toner of a specific color, the same steps beings repeated for a different color and afterward repeated for the remaining colors, and the images of each color are fixed after being positioned on the same recording sheet and transferred, thereby producing a color picture.

6. A picture producing apparatus according to claim 1 where a number of recording electrodes arranged in a direction perpendicular to a traveling direction of an electrostatic recording means, which is moved for recording the pixels on the recording sheet, are applied with voltages to form an electrostatic latent image on the electrostatic recording means, and the latent image is transferred onto the recording sheet, after being developed by toner, and fixed therein.

7. A picture producing apparatus according to claim 6 where a series, or a part of a series, of steps to form a latent image on the electrostatic recording means, develop the latent image with toner, and transfer the developed image to the recording sheet are carried out using toner of a specific color, the same steps being repeated for a different color, and the images of each color being fixed after being positioned on the same recording sheet and transferred, thereby producing a color picture.

8. A picture producing apparatus according to claim 1 where the medium picture is recorded on a photographic material as a recording medium.

9. A picture producing apparatus according to claim 8 where The characteristic curve of the recording medium is a photographic characteristic curve defining a relationship between the density information values (D values) and the picture information values (X values) correlated to incident light intensities from the original picture into the recording medium.

10. A picture producing apparatus according to claim 1 where the medium picture is recorded on a photoelectric transfer device as a recording medium.

11. A picture producing apparatus according to claim 10 where the characteristic curve of the recording medium is a photoelectric transfer characteristic curve defining a relationship between the density information values (D values) and the picture information values (X values) correlated to incident light intensities from the original picture into the recording medium.

* * * * *